US012684542B2

(12) United States Patent
Sun et al.

(10) Patent No.: US 12,684,542 B2
(45) Date of Patent: Jul. 14, 2026

(54) CHANNEL OCCUPANCY TIME (COT) SHARING FOR SIDELINK

(71) Applicant: QUALCOMM Incorporated, San Diego, CA (US)

(72) Inventors: Jing Sun, San Diego, CA (US); Xiaoxia Zhang, San Diego, CA (US); Shailesh Patil, San Diego, CA (US); Arthur Gubeskys, San Diego, CA (US); Aleksandar Damnjanovic, Del Mar, CA (US); Juan Montojo, San Diego, CA (US); Gene Wesley Marsh, San Diego, CA (US); Stelios Stefanatos, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 382 days.

(21) Appl. No.: 18/253,960

(22) PCT Filed: Dec. 30, 2021

(86) PCT No.: PCT/US2021/065767
§ 371 (c)(1),
(2) Date: May 23, 2023

(87) PCT Pub. No.: WO2022/147310
PCT Pub. Date: Jul. 7, 2022

(65) Prior Publication Data
US 2024/0064713 A1 Feb. 22, 2024

(30) Foreign Application Priority Data
Jan. 4, 2021 (GR) .............................. 20210100003

(51) Int. Cl.
*H04W 72/0446* (2023.01)
*H04W 72/25* (2023.01)
(Continued)

(52) U.S. Cl.
CPC ....... *H04W 72/0446* (2013.01); *H04W 72/25* (2023.01); *H04W 72/40* (2023.01); *H04W 92/18* (2013.01)

(58) Field of Classification Search
CPC . H04W 92/18; H04W 72/25; H04W 72/0446; H04W 72/40
See application file for complete search history.

(56) References Cited

U.S. PATENT DOCUMENTS 11,924,878 B2 * 3/2024 Xu .................... H04W 74/0866
2020/0260231 A1 8/2020 Ganesan et al.
(Continued)

FOREIGN PATENT DOCUMENTS

CN 111565475 A 8/2020
JP 2022517942 A 3/2022
(Continued)

OTHER PUBLICATIONS

Apple: "Considerations on NR V2X Physical Layer Procedure", 3GPP TSG RAN WG1 #97, 3GPP Draft, R1-1907337 Considerations on NR V2X Physical Layer Procedures, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019, pp. 1-6, May 13, 2019 (May 13, 2019), XP051728776, the whole document, Chapter 3 Self-Contained Frame Structure within COT.
(Continued)

*Primary Examiner* — Raj Jain
(74) *Attorney, Agent, or Firm* — Harrity & Harrity LLP

(57) ABSTRACT
Wireless communications systems and methods related to channel occupancy time (COT) sharing for sidelink communications are provided. A first user equipment (UE) receives, from a second UE, a first sidelink transmission during a first channel occupancy time (COT), where the first
(Continued)

COT is associated with the second UE. The first UE determines whether the second UE is one of two or more UEs intended to receive a second sidelink transmission. The first UE transmits, to the two or more UEs, the second sidelink transmission during a portion of the first COT based on COT sharing. The COT sharing is in response to determining the second UE is one of the two or more UEs intended to receive the second sidelink transmission.

27 Claims, 13 Drawing Sheets

(51) Int. Cl.
H04W 72/40 (2023.01)
H04W 92/18 (2009.01)

(56) References Cited

U.S. PATENT DOCUMENTS

| | | | |
|---|---|---|---|
| 2022/0078845 A1 | 3/2022 | Xu et al. | |
| 2022/0167407 A1* | 5/2022 | Oviedo | H04W 72/0446 |
| 2022/0295560 A1* | 9/2022 | Shokri Razaghi | H04W 72/23 |
| 2023/0217492 A1* | 7/2023 | Garcia Rodriguez | H04W 74/0816 |
| 2023/0388811 A1* | 11/2023 | Cui | 370/329<br>H04W 16/14 |
| 2023/0422299 A1* | 12/2023 | Kiilerich Pratas | H04W 74/0808 |
| 2024/0063881 A1* | 2/2024 | Salem | H04B 7/0695 |
| 2024/0064713 A1* | 2/2024 | Sun | H04W 72/25 |

FOREIGN PATENT DOCUMENTS

| | | |
|---|---|---|
| WO | 2020024854 A1 | 2/2020 |
| WO | 2020046607 A1 | 3/2020 |
| WO | 2020164439 A1 | 8/2020 |
| WO | 2020168320 A1 | 8/2020 |

OTHER PUBLICATIONS

International Search Report and Written Opinion—PCT/US2021/065767—ISA/EPO—Apr. 5, 2022.

* cited by examiner

600

Initiate
COT
510

COT 524

620

530        540

LBT
522

A        B        D 532        506        642        508

COT 654

660

LBT
652

D

Time

700

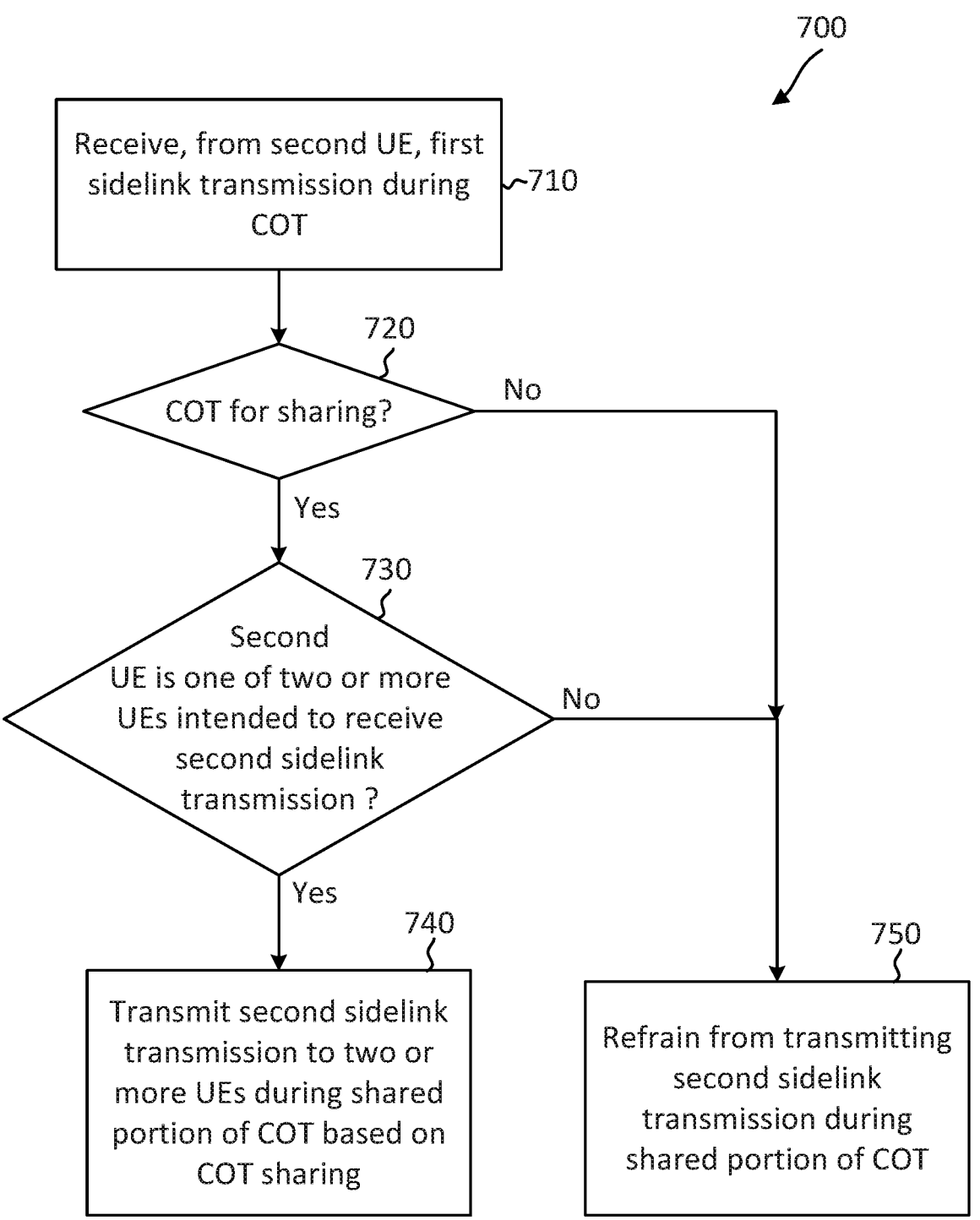

Receive, from second UE, first sidelink transmission during COT ∽710

720

COT for sharing?    No

Yes

730

Second UE is one of two or more UEs intended to receive second sidelink transmission ?    No Yes

740

Transmit second sidelink transmission to two or more UEs during shared portion of COT based on COT sharing

750

Refrain from transmitting second sidelink transmission during shared portion of COT

FIG. 7

BASE STATION 1000

Processor 1002

MEMORY 1004

Instructions 1006

Sidelink Configuration Module 1008

Transceiver 1010

Modem 1012

RF Unit 1014

Antennas 1016

1200

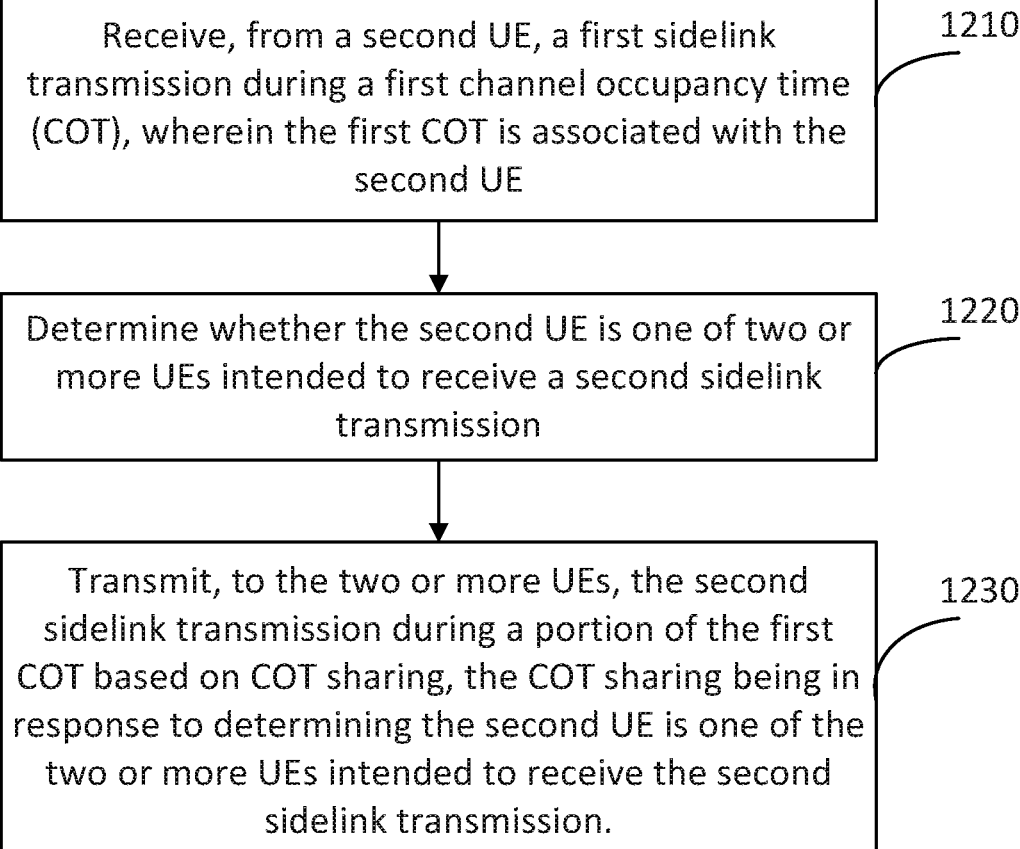

Receive, from a second UE, a first sidelink transmission during a first channel occupancy time (COT), wherein the first COT is associated with the second UE — 1210

Determine whether the second UE is one of two or more UEs intended to receive a second sidelink transmission — 1220

Transmit, to the two or more UEs, the second sidelink transmission during a portion of the first COT based on COT sharing, the COT sharing being in response to determining the second UE is one of the two or more UEs intended to receive the second sidelink transmission. — 1230

FIG. 12

CHANNEL OCCUPANCY TIME (COT) SHARING FOR SIDELINK

CROSS REFERENCE TO RELATED APPLICATIONS

The present application is a 35 U.S.C. 371 National Phase entry of Patent Cooperation Treaty (PCT) Application No. PCT/US2021/065767, filed Dec. 30, 2021, which claims priority to and the benefit of Greek patent application No. 20210100003, filed Jan. 4, 2021, titled CHANNEL OCCU-PANCY TIME (COT) SHARING FOR SIDELINK, both of which are hereby incorporated by reference in their entireties as if fully set forth below and for all applicable purposes.

TECHNICAL FIELD

This application relates to wireless communication systems, and more particularly to channel occupancy time (COT) sharing for sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), the method includes receiving, from a second UE, a first sidelink transmission during a first channel occupancy time (COT), where the first COT is associated with the second UE; determining whether the second UE is one of two or more UEs intended to receive a second sidelink transmission; and transmitting, to the two or more UEs, the second sidelink transmission during a portion of the first COT based on COT sharing, the COT sharing being in response to determining the second UE is one of the two or more UEs intended to receive the second sidelink transmission.

In an additional aspect of the disclosure, a first user equipment (UE) includes a transceiver configured to receive, from a second UE, a first sidelink transmission during a first channel occupancy time (COT), where the first COT is associated with the second UE; and a processor coupled to the transceiver, where the processor is configured to determine whether the second UE is one of two or more UEs intended to receive a second sidelink transmission, where the transceiver is further configured to transmit, to the two or more UEs, the second sidelink transmission during a portion of the first COT based on COT sharing, the COT sharing being in response to determining the second UE is one of the two or more UEs intended to receive the second sidelink transmission.

In an additional aspect of the disclosure, a non-transitory computer-readable medium having program code recorded thereon, the program code includes code for causing a first user equipment (UE) to receive, from a second UE, a first sidelink transmission during a first channel occupancy time (COT), where the first COT is associated with the second UE; code for causing the first UE to determine whether the second UE is one of two or more UEs intended to receive a second sidelink transmission; and code for causing the first UE to transmit, to the two or more UEs, the second sidelink transmission during a portion of the first COT based on COT sharing, the COT sharing being in response to determining the second UE is one of the two or more UEs intended to receive the second sidelink transmission.

In an additional aspect of the disclosure, a first user equipment (UE) includes means for receiving, from a second UE, a first sidelink transmission during a first channel occupancy time (COT), where the first COT is associated with the second UE; means for determining whether the second UE is one of two or more UEs intended to receive a second sidelink transmission; and means for transmitting, to the two or more UEs, the second sidelink transmission during a portion of the first COT based on COT sharing, the COT sharing being in response to determining the second UE is one of the two or more UEs intended to receive the second sidelink transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is a flow diagram of a sidelink COT sharing method according to some aspects of the present disclosure.

FIG. 12 is a flow diagram of a wireless communication method according to some aspects of the present disclosure.

DETAILED DESCRIPTION

Figure 1:
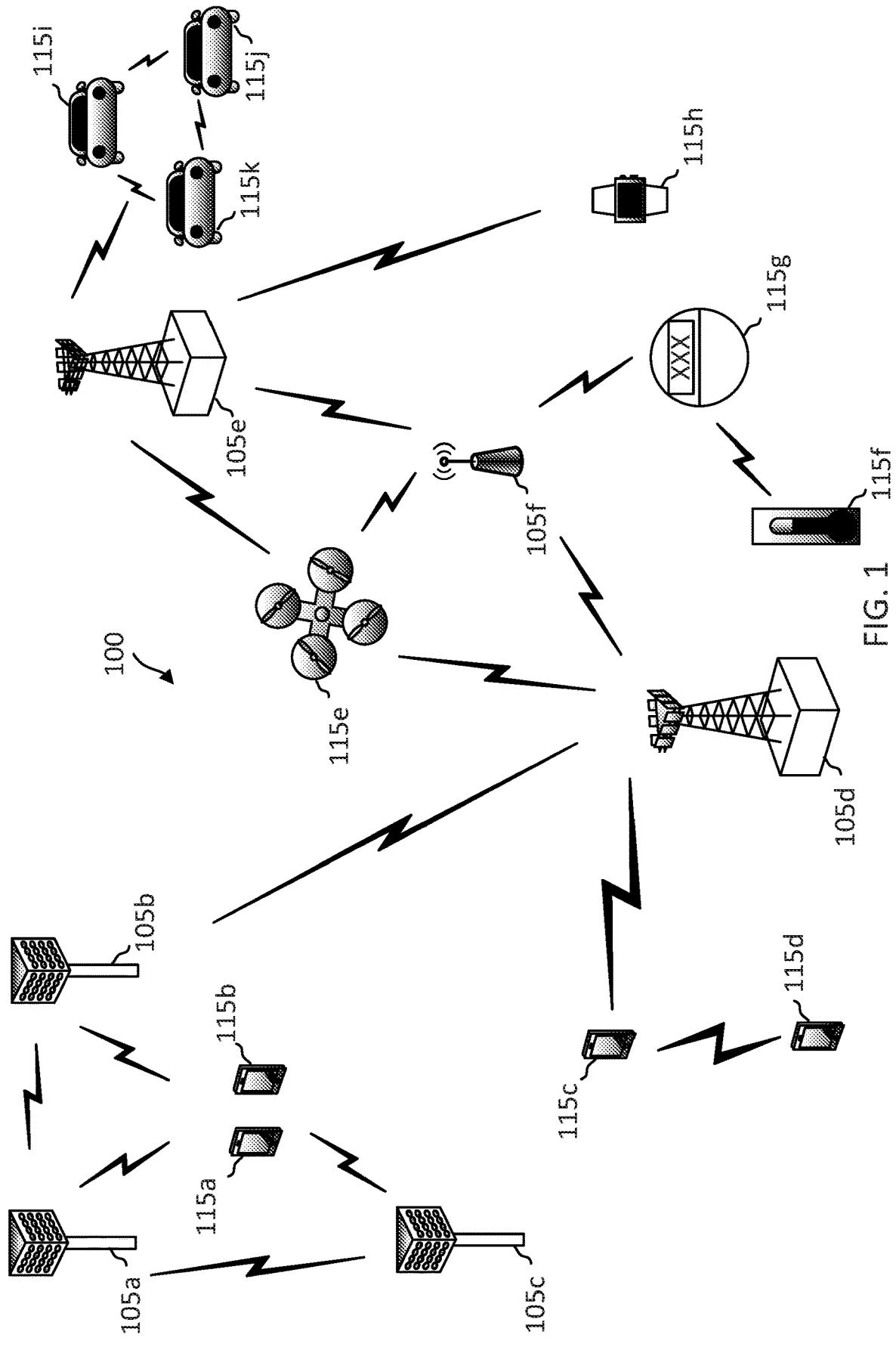
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave)

transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and operate as a receiving sidelink UE at another time.

As used herein, the terms "sync UE", "sidelink sync UE", "anchor UE", or "sidelink anchor UE" refer to a sidelink UE transmitting an S-SSB to facilitate sidelink communications among multiple sidelink UEs (e.g., when operating in a standalone sidelink system), and the terms are interchangeable without departing from the scope of the present disclosure. As used herein, the terms "non-sync UE", "non-anchor UE", or "client" refer to a sidelink UE that relies on an anchor UE to provide sidelink system information. A sidelink UE may operate as an initiating UE at one time and operate as a responding UE at another time. A sidelink sync UE may also operate as a transmitting sidelink UE and/or initiating UE at one time and operate as a receiving sidelink UE and/or a responding UE at another time.

As used herein, the term "initiating UE" can refer to a user equipment device initiating or acquiring a channel occupancy time (COT) in a shared radio frequency band (e.g., in a shared spectrum or an unlicensed spectrum) for sidelink communication. For instance, the initiating UE may perform a clear channel assessment (CCA) or a category 4 (CAT4) listen-before-talk (LBT) in the shared radio frequency band to contend or acquire the COT. Upon passing the LBT (indicating the channel is clear for transmission), the initiating UE may transmit a sidelink transmission during the acquired COT. As used herein, the term "responding UE" can refer to a user equipment device responding to a sidelink transmission transmitted by any initiating UE. A sidelink UE may operate as an initiating UE at one time and operate as a responding UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A serving BS may also configure a sidelink UE to operate as a sidelink anchor UE to provide sidelink system information for out-of-coverage sidelink UEs to communicate sidelink communications. For instance, a sidelink anchor UE may provide sidelink system information by broadcasting sidelink-synchronization signal block (S-SSB). The S-SSB may be analogous to the SSB broadcast by a BS. For instance, an S-SSB may include synchronization signals and/or sidelink system information. Some examples of sidelink system information may include a sidelink bandwidth part (BWP) configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some implementations, an anchor UE may also schedule other sidelink UEs for communications. Thus, a sidelink anchor UE may operate as a mini-gNB facilitating and/or coordinating communications among sidelink UEs over. A sidelink channel where two UEs may communicate with each other directly may also be referred to as a PC5 interface in 5G NR.

A sidelink communication can be in a unicast mode, a groupcast mode, or a broadcast mode. Additionally, hybrid automatic repeat request (HARQ) can be applied to a unicast or a groupcast sidelink communication to improve transmission reliability.

For unicast communication, a sidelink transmitting UE may transmit a sidelink transmission including data to a single sidelink receiving UE and may request a HARQ acknowledgement/negative-acknowledgement (ACK/ NACK) feedback from the sidelink receiving UE. If the sidelink receiving UE successfully decoded data from the sidelink transmission, the sidelink receiving UE transmits an ACK. Conversely, if the sidelink receiving UE fails to decode data from the sidelink transmission, the sidelink receiving UE transmits an NACK. Upon receiving a NACK, the sidelink transmitting UE may retransmit the data. For broadcast communication, a sidelink transmitting UE may transmit a sidelink transmission to a group of sidelink receiving UEs (e.g., 2, 3, 4, 5, 6 or more) in a neighborhood of the sidelink transmitting UE and may not request for an ACK/NACK feedback for the sidelink transmission.

A groupcast sidelink communication can be connection-based or connectionless. A connection-based groupcast sidelink communication is destined to a specific group of UEs, for example, each belongs to a group identified by a group identifier (ID), and known to the sidelink transmitting to the UE. As such, the sidelink transmitting UE may request an ACK/NACK feedback from each sidelink receiving UE in the group and may also assign each sidelink receiving UE in the group with a different feedback resource. For a connectionless groupcast sidelink communication, the group of UEs that can receive the groupcast transmission may be unknown to the sidelink transmitting UE. As such, the sidelink transmitting UE may request an NACK-only feedback from UEs that received the groupcast sidelink communication (successfully decoded the presence of the SCI), but fails to decode information data from the groupcast sidelink communication. In some instances, the sidelink transmitting UE may also assign the same NACK-only feedback resource to all UEs that failed the data decoding.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum are relatively straight-forward as channel access in the dedicated spectrum or licensed spectrum is guaranteed.

NR-unlicensed (NR-U) can bring benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) are required to contend for channel access in the spectrum, for example, via clear channel assessment (CCA) and/or listen-before-talk (LBT) procedures.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, an initiating UE may contend for a COT in a shared radio frequency band by performing CCA or a CAT4 LBT. Upon passing the CCA or CAT4 LBT (indicating the channel is cleared for transmission), the initiating UE may transmit a sidelink transmission to a sidelink receiving UE during the COT. In some sidelink use cases (e.g., for V2X), sidelink data traffic may include small-sized or short data bursts (e.g., with a few bytes to tens of bytes of information data). In some aspects, the duration of a COT may be dependent on regulations imposed by a regulator of the shared radio frequency band or a certain deployment. Thus, in some instances, the sidelink transmission with the small-sized data bursts may not occupy the entire duration of the COT. Accordingly, it may be desirable to share the remaining duration of the COT with the receiving UE instead of leaving the remaining COT unused.

In NR-U, each UE is served by one serving BS, and COT sharing is supported between a BS and a served UE. For instance, a BS may perform a CAT4 LBT in a shared channel to contend for a COT. Upon passing the CAT4 LBT, the BS may transmit a DL transmission to a served UE during a portion of the COT. The BS may allow the served UE to utilize a remaining portion of the COT. In some instances, the BS may schedule the served UE to transmit an UL transmission during the remaining portion. The served UE may perform a CAT2 LBT or no LBT when the served UE transmits during the BS initiated COT. CAT2 LBT or no LBT has less overhead and less uncertainty in accessing the channel. Accordingly, COT sharing can provide efficient operations. Similarly, a UE may perform a CAT4 LBT in a shared channel to contend for a COT. Upon passing the CAT4 LBT, the UE may transmit an UL transmission (e.g., a configured grant or grantless transmission) to a serving BS during a portion of the COT. The UE may share a remaining portion of the UE initiated COT with the serving BS.

As can be observed, the BS-UE COT sharing is based on a transmitting device initiating or contending a COT and a receiving or responding device sharing the COT, but limited to a transmission that is destined to the transmitting device that initiated the COT. The BS-UE COT sharing may perform well for communications between a BS and a served UE since BS-UE communications are mostly unicast (e.g., a transmission from a single source to a specified or receiver). On the other hand, sidelink communications are frequently groupcast (e.g., a transmission from a single source to a group of receivers). Furthermore, a sidelink UE receiving a groupcast may in turn transmit another groupcast transmission to multiple sidelink UEs. As such, COT sharing limiting to sharing between a pair of initiating device and a single responding device may not be suitable for sidelink use cases with mostly sidelink groupcast.

The present application describes mechanisms for COT sharing in sidelink groupcast and/or broadcast communications. For example, an initiating UE (e.g., a first UE) may contend for a COT in a shared channel by performing a CAT4 LBT. Upon passing the CAT4 LBT (indicating the channel is cleared for transmission), the initiating UE may transmit a first sidelink transmission during a portion of the COT. The first sidelink transmission can be a unicast transmission, a groupcast transmission, or a broadcast transmission. A responding UE (e.g., a second UE) of the first sidelink transmission may share a remaining portion the COT. In some aspects, the responding UE may be allowed to utilize the remaining portion of the COT for a second sidelink transmission in a groupcast mode (e.g., connection-based or connectionless) or a broadcast mode if the initiating UE is an intended recipient of the second sidelink transmission. In this regard, the responding UE may determine whether the initiating UE is one of two or more UEs intended to receive the second sidelink transmission. A connection-based groupcast transmission is destined to a group of UEs known to the responding UE. For instance, each UE in the group is assigned with a certain group identifier (ID). A connectionless groupcast transmission is to be received by a group of UEs unknown to the responding UE. In some instances, a connectionless groupcast transmission may be intended for UEs in a certain zone. Thus, if the second sidelink transmission is in a connectionless groupcast mode, the responding UE may determine whether the initiating UE is an intended recipient based on zone information associated with the initiating UE. The zone information may be related to a geographical location of the initiating UE or a physical distance between the initiating UE and the responding UE. In some instances, zones can be preconfigured, and the initiating UE may include zone information (e.g., a zone ID identifying a zone associated with the initiating UE) in SCI within the first sidelink transmission. If the responding UE determines that the initiating UE is one of the two or more UEs intended to receive the second sidelink transmission, the responding UE may transmit the second sidelink transmission to the two or more UEs during the remaining portion (a shared portion) of the COT. If, however, the responding UE determines that the initiating UE is not one of the two or more UEs intended to receive the second sidelink transmission, the responding UE may refrain from transmitting the second sidelink transmission during the remaining portion (a shared portion) of the COT.

The first sidelink transmission may include SCI (e.g., SCI-1 or SCI-2) and sidelink data. In some aspects, the SCI may include an indication indicating whether the first sidelink transmission is transmitted by a UE that initiated the COT, and the responding UE may determine whether to transmit the second sidelink transmission in the COT based on the SCI. For instance, the responding UE may share the COT if the SCI indicates that the first sidelink transmission is from an initiating UE of the COT, and may refrain from sharing the COT if the SCI indicates that the first sidelink transmission is not from an initiating UE of the COT. In some aspects, the SCI may include a COT-SI including COT sharing information (e.g., a duration of the COT for sharing) and the indication of whether the first sidelink transmission is from a UE that initiated the COT. In some aspects, the first sidelink transmission is a unicast transmission, and the responding UE may transmit, to the initiating UE, an ACK/NACK feedback for the first sidelink transmission during the COT. In some aspects, the first sidelink transmission is a connection-based groupcast transmission, and the responding UE may transmit, to the initiating UE, an ACK/NACK feedback for the first sidelink transmission during the COT. In some aspects, the first sidelink transmission is a connectionless groupcast transmission, and the responding UE may transmit, to the initiating UE, an NACK-only feedback for the first sidelink transmission during the COT.

In some aspects, a third UE may receive the second sidelink transmission during the COT. The third UE may transmit an ACK/NACK feedback for the second sidelink transmission when the second sidelink transmission is a connection-based groupcast. Alternatively, the third UE may transmit an NACK-only feedback for the second sidelink transmission, when the second sidelink transmission is a connectionless groupcast. The third UE may determine whether to transmit the ACK/NACK feedback or the NACK-only feedback during the COT based on whether the third UE detected COT sharing information related to the COT (e.g., transmitted along with the first sidelink transmission). In this regard, if the third UE detected the COT sharing information, the third UE may transmit the ACK/NACK feedback or the NACK-only feedback during the COT. If, however, the third UE fails to detect the COT sharing information, the third UE may refrain from transmitting the ACK/NACK feedback or the NACK-only feedback during the COT.

Aspects of the present disclosure can provide several benefits. For example, allowing a responding UE to share a COT for groupcast sidelink transmission (where no LBT or a CAT2 LBT can be performed prior to the groupcast sidelink transmission) can improve sidelink operation efficiency. Restricting sharing of a COT based on whether an initiating UE of the COT is an intended recipient can avoid COT sharing propagation. COT sharing propagation may refer to an initiating UE sharing a COT with a responding UE, and the responding UE further sharing a COT with another UE, which may further share the COT with yet another UE, and so on. While the present disclosure is described in the context of COT sharing for sidelink groupcast, the present disclosure may also be applied to COT sharing for sidelink broadcast.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively.

In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Figure 2:
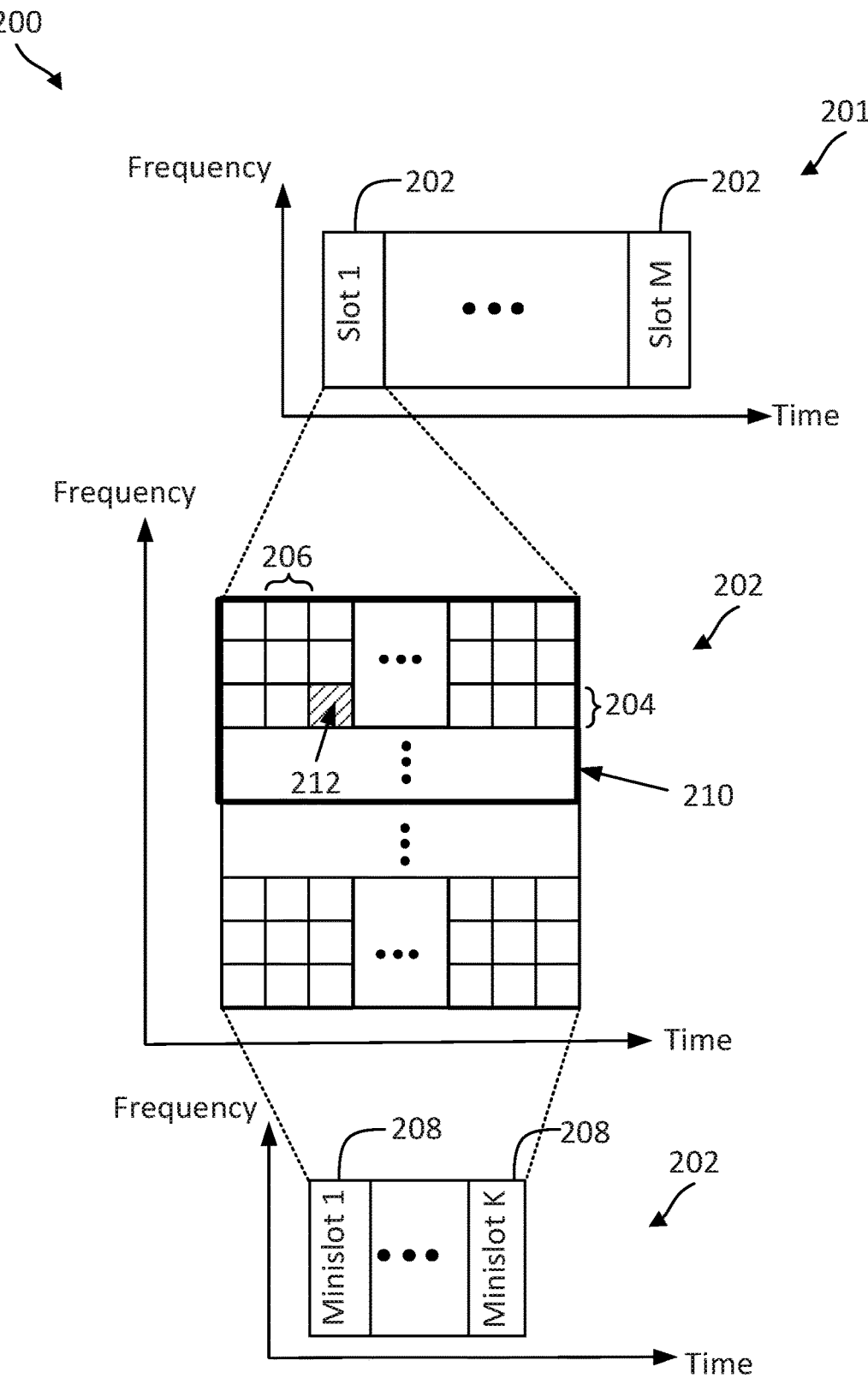
FIG. 2 is a timing diagram illustrating a radio frame structure according to some aspects of the present disclosure

In some aspects, the network 100 may provision for sidelink communications to allow a UE 115 to communicate with another UE 115 without tunneling through a BS 105 and/or the core network as shown in FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI (which may be referred to as SCI-1), the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI (which may be referred to as SCI-2), the UE 115 may transmit SCI in PSSCH carrying information for decoding the PSSCH. The second-stage SCI may include an 8-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement(ACK)-negative acknowledgement (NACK) for a previously transmitted PSSCH.

In some aspects, a BS 105 may configure a UE 115 to operate as a sidelink sync or anchor UE 115 to provide sidelink system information for other sidelink UEs 115, which may be out of the coverage of the BS 105, to communicate sidelink communications. The sidelink sync UE 115 may transmit the sidelink system information in the form of S-SSBs. An S-SSB may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some aspects, the BS 105 may configure the sidelink sync UE 115 to transmit the S-SSB according to a synchronization raster defined for NR-U. In some instances, the S-SSB according to the NR-U synchronization raster may be offset from a lowest frequency of a corresponding sidelink BWP where the S-SSB is transmitted. In some other aspects, the BS 105 may transmit the S-SSB according to a synchronization raster defined for sidelink. The sidelink synchronization raster can be defined such that the S-SSB may be aligned to a lowest frequency of a corresponding sidelink BWP where the S-SSB is transmitted.

In some aspects, a sidelink communication can be in a unicast mode, a groupcast mode, or a broadcast mode, where HARQ may be applied to unicast and/or groupcast communications. For unicast communication, a sidelink transmitting UE 115 may transmit a sidelink transmission including data to a single sidelink receiving UE 115 and may request a HARQ acknowledgement/negative-acknowledgement (ACK/NACK) feedback from the sidelink receiving UE 115. If the sidelink receiving UE 115 successfully decoded data from the sidelink transmission, the sidelink receiving UE 115 transmits an ACK. Conversely, if the sidelink receiving UE 115 fails to decode data from the sidelink transmission, the sidelink receiving UE 115 transmits an NACK. Upon receiving a NACK, the sidelink transmitting UE 115 may retransmit the data. For broadcast communication, a sidelink transmitting UE 115 may transmit a sidelink transmission to a group of sidelink receiving UEs 115 (e.g., 2, 3, 4, 5, 6 or more) in a neighborhood of the sidelink transmitting UE 115 and may not request for an ACK/NACK feedback for the sidelink transmission.

For groupcast communication, a sidelink transmitting UE 115 may transmit a sidelink transmission to a group of sidelink receiving UEs 115 (e.g., 2, 3, 4, 5, 6 or more). Groupcast communication may have a wide variety of use cases in sidelink. As an example, groupcast communication can be used in a V2X use case (e.g., vehicle platooning) to instruct a group of vehicles nearby an intersection or traffic light to stop at the intersection. In some aspects, a groupcast communication can be connection-based, where the group of the sidelink receiving UEs 115 may be preconfigured as a group identified by a group identifier (ID). As such, the sidelink receiving UEs 115 in the group are known to the sidelink transmitting UE 115, and thus the sidelink transmitting UE 115 may request an ACK/NACK feedback from each sidelink receiving UE 115 in the group. In some instances, the sidelink transmitting UE 115 may provide each sidelink receiving UE with a different resource (e.g., an orthogonal resource) for transmitting an ACK/NACK feedback. In some other aspects, a groupcast communication can be connectionless, where the group of sidelink receiving UEs 115 that can receive the groupcast transmission may be unknown to the sidelink transmitting UE 115. In some instances, the group of sidelink receiving UEs 115 may receive the groupcast communication based on a zone or geographical location of the receiving UEs 115. Since the sidelink transmitting UE 115 may not have knowledge of the receiving sidelink UEs 115, the sidelink transmitting UE 115 may request an NACK-only feedback from the sidelink receiving UEs 115. For instance, a sidelink receiving UE 115 may transmit an NACK if the sidelink receiving UE detected the presence of SCI, but fails to decode data (transport block) from the sidelink transmission. The sidelink receiving UE 115 may not transmit an ACK if the data decoding is successful. In some instances, the sidelink receiving UEs 115 may be assigned with the same resource for transmitting an NACK feedback. The simultaneous NACK transmission from multiple sidelink receiving UEs 115 in the same resource may form a single frequency network (SFN) transmission (where waveforms of the multiple NACK transmissions are combined) at the sidelink transmitting UE 115. Similar to the unicast communication, the sidelink transmitting UE 115 may retransmit sidelink data upon receiving an NACK for a connection-based or connectionless groupcast transmission.

According to aspects of the present disclosure, an initiating UE 115 (e.g., a first UE) may contend for a COT in a shared channel by performing a CAT4 LBT. Upon passing the CAT4 LBT (indicating the channel is cleared for transmission), the initiating UE 115 may transmit a first sidelink transmission during a portion of the COT. The first sidelink transmission can be a unicast transmission, a groupcast transmission, or a broadcast transmission. A responding UE 115 (e.g., a second UE) of first sidelink transmission may share a remaining portion the COT. In some aspects, the responding UE 115 may be allowed to utilize the remaining portion of the COT for a second sidelink transmission in a groupcast mode (e.g., connection-based or connectionless) or a broadcast mode if the initiating UE 115 is an intended recipient of the second sidelink transmission. In this regard, the responding UE 115 may determine whether the initiating UE 115 is one of two or more UEs 115 intended to receive the second sidelink transmission. If the second sidelink transmission is in a connectionless groupcast mode, the responding UE 115 may determine whether the initiating UE 115 is an intended recipient based on zone information associated with the initiating UE 115. The zone information may be related to a geographical location of the initiating UE 115 or a physical distance between the initiating UE 115 and the responding UE 115. In some instances, zones can be preconfigured, and the initiating UE 115 may include zone information (e.g., a zone ID identifying a zone associated with the initiating UE 115) in SCI within the first sidelink transmission. In some instances, the zone information is part of a second stage SCI of the first sidelink transmission. If the responding UE 115 determines that the initiating UE 115 is one of the two or more UEs 115 intended to receive the second sidelink transmission, the responding UE 115 may transmit the second sidelink transmission to the two or more UEs during the remaining portion (a shared portion) of the COT. If, however, the responding UE 115 determines that the initiating UE 115 is not one of the two or more UEs 115 intended to receive the second sidelink transmission, the responding UE 115 may refrain from transmitting the second sidelink transmission during the remaining portion (a shared portion) of the COT.

The first sidelink transmission may include SCI (e.g., SCI-1 or SCI-2) and sidelink data. In some aspects, the SCI may include an indication indicating whether the first sidelink transmission is from a UE 115 that initiated the COT, and the responding UE 115 may determine to transmit the second sidelink transmission in the COT based on the SCI indicating that the first sidelink transmission is transmitted by an initiating UE of the COT. In some aspects, the SCI may include a COT-SI including COT sharing information (e.g., a duration of the COT for sharing) and the indication of whether the first sidelink transmission is from a UE 115 that initiated the COT. In some aspects, the first sidelink transmission is a unicast transmission, and the responding UE 115 may transmit an ACK/NACK feedback to the initiating UE 115 during the COT. In some aspects, the first sidelink transmission is a connection-based groupcast transmission, and the responding UE 115 may transmit an ACK/ NACK feedback to the initiating UE 115 during the COT. In some aspects, the first sidelink transmission is a connectionless groupcast transmission, and the responding UE 115 may transmit an NACK-only feedback to the initiating UE 115 during the COT.

In some aspects, a receiving UE 115 (e.g., a third UE) of the second sidelink transmission may also transmit an ACK/NACK feedback for the second sidelink transmission (e.g., when the second sidelink transmission is a connection-based groupcast) or an NACK-only feedback for the second sidelink transmission (e.g., when the second sidelink transmission is a connectionless groupcast). The third UE may determine whether to transmit the ACK/NACK feedback or the NACK-only feedback during the COT based on whether the third UE detected the COT sharing information of the first sidelink transmission. In this regard, if the third UE detected the COT sharing information of the first sidelink transmission, the third UE may transmit the ACK/NACK feedback or the NACK-only feedback during the COT. If, however, the third UE fails to detect the COT sharing information of the first sidelink transmission, the third UE may refrain from transmitting the ACK/NACK feedback or the NACK-only feedback during the COT. Mechanisms for COT sharing for sidelink communications (e.g., in a group-cast mode or a broadcast mode) are described in greater detail herein.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N-1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols). In some aspects, a UE (e.g., UE 115*i* of FIG. 1) may communicate sidelink with another UE (e.g., UE 115*j* of FIG. 1) in units of time slots similar to the slot 202 as will be further described below in with respect to FIG. 4.

Figure 3:
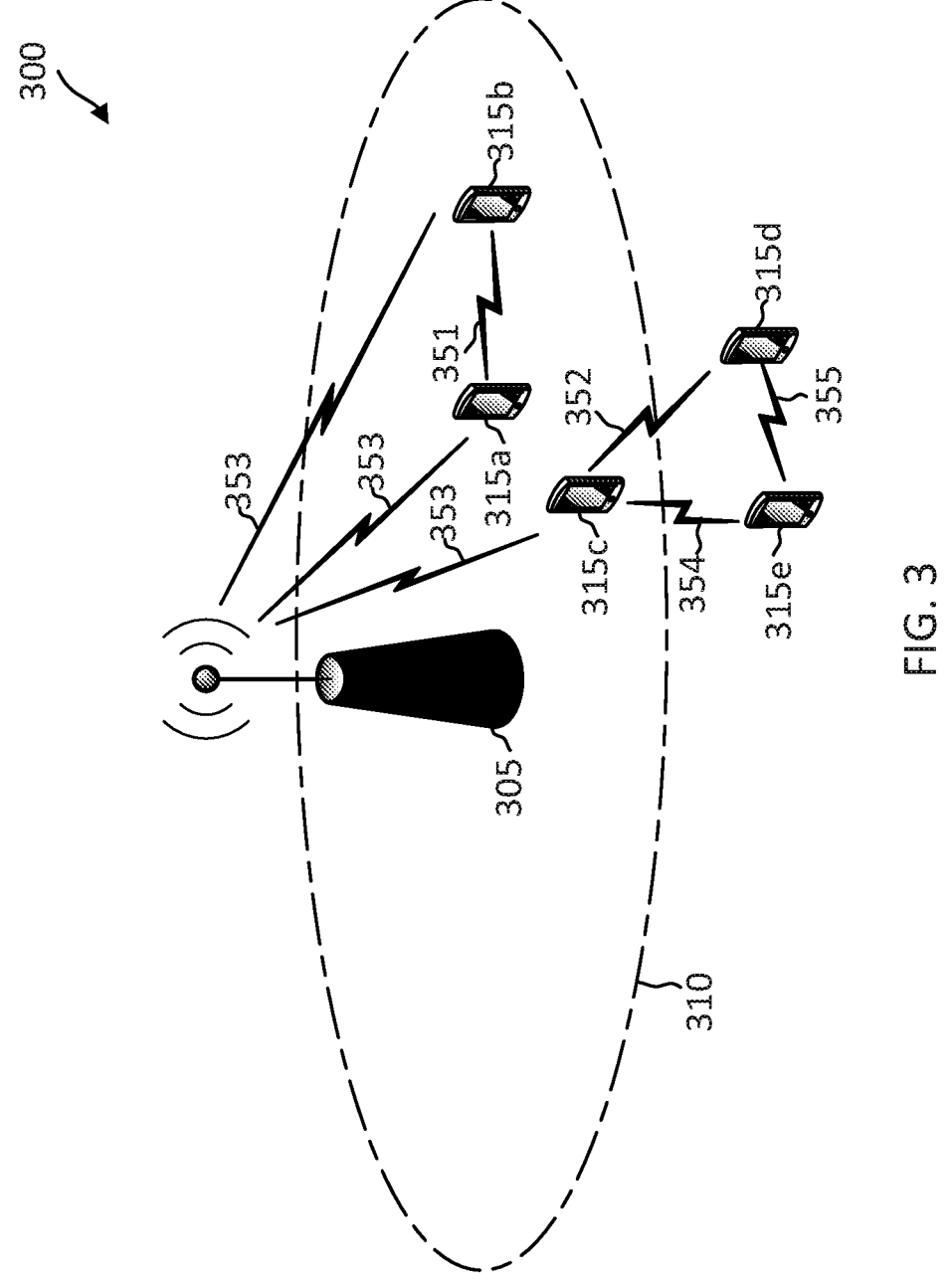
FIG. 3 illustrates a wireless communication network that provisions for sidelink communications according to some aspects of the present disclosure.

FIG. 3 illustrates an example of a wireless communication network 300 that provisions for sidelink communications according to aspects of the present disclosure. The network 300 may correspond to a portion of the network 100 may utilize the radio frame structure 200 for communications. FIG. 3 illustrates one BS 305 and five UEs 315 (shown as 315*a*, 315*b*, 315*c*, 315*d*, and 315*e*) for purposes of simplicity of discussion, though it will be recognized that aspects of the present disclosure may scale to any suitable number of UEs 315 (e.g., the about 2, 3, 4, 6, 7 or more) and/or BSs 305 (e.g., the about 2, 3 or more). The BS 305 and the UEs 315 may be similar to the BSs 105 and the UEs 115, respectively. The BS 305 and the UEs 315 may share the same radio frequency band for communications. In some instances, the radio frequency band may be a licensed band. In some instances, the radio frequency band may be an unlicensed band. In some instances, the radio frequency band may be a frequency range 1 (FR1) band. In some instances, the radio frequency band may be a FR2 band. In general, the radio frequency band may be at any suitable frequency.

In the network 300, some of the UEs 315 may communicate with each other in peer-to-peer communications. For example, the UE 315*a* may communicate with the UE 315*b* over a sidelink 351, the UE 315*c* may communicate with the UE 315*d* over a sidelink 352 and/or with the UE 315*e* over a sidelink 354, and the UE 315*d* may communicate with the UE 315*e* over a sidelink 355. The sidelinks 351, 352, 354, and 355 are unicast bidirectional links. In some aspects, the UE 315*c* may also communicate with the UE 315*d* and the UE 315*e* in a groupcast mode. Similarly, the UE 315*d* may also communicate with the UE 315*c* and the UE 315*e* in a groupcast mode. In general, the UEs 315*c*, 315*d*, an 315*e* may communicate with each other in a unicast mode or a groupcast mode.

Some of the UEs 315 may also communicate with the BS 305 in a UL direction and/or a DL direction via communication links 353. For instance, the UE 315*a*, 315*b*, and 315*c* are within a coverage area 310 of the BS 305, and thus may be in communication with the BS 305. The UE 315*d* and UE 315*e* are outside the coverage area 310, and thus may not be in direct communication with the BS 305. In some instances, the UE 315*c* may operate as a relay for the UE 315*d* to reach the BS 305. In some aspects, some of the UEs 315 are associated with vehicles (e.g., similar to the UEs 115*i-k*) and the communications over the sidelinks 351 and/or 352 may be C-V2X communications. C-V2X communications may refer to communications between vehicles and any other wireless communication devices in a cellular network.

In some aspects, the BS 305 may configure a sidelink UE 315 to operate as a sidelink anchor UE (e.g., the UE 315*c*). When operating as a sidelink sync UE, the UE 315 may broadcast S-SSBs, which may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. Accordingly, other UEs (e.g., the UEs 315*d* and 315*e*) that are nearby the UE 315*c*, but may be out of the coverage of the BS 305 may listen to and synchronize to the S-SSBs and communicate with each other based on the S-SSBs. The other UEs 315*d* and 315*e* receiving the sidelink system information from the UE 315*c* may be referred to as client UEs.

Figure 4:
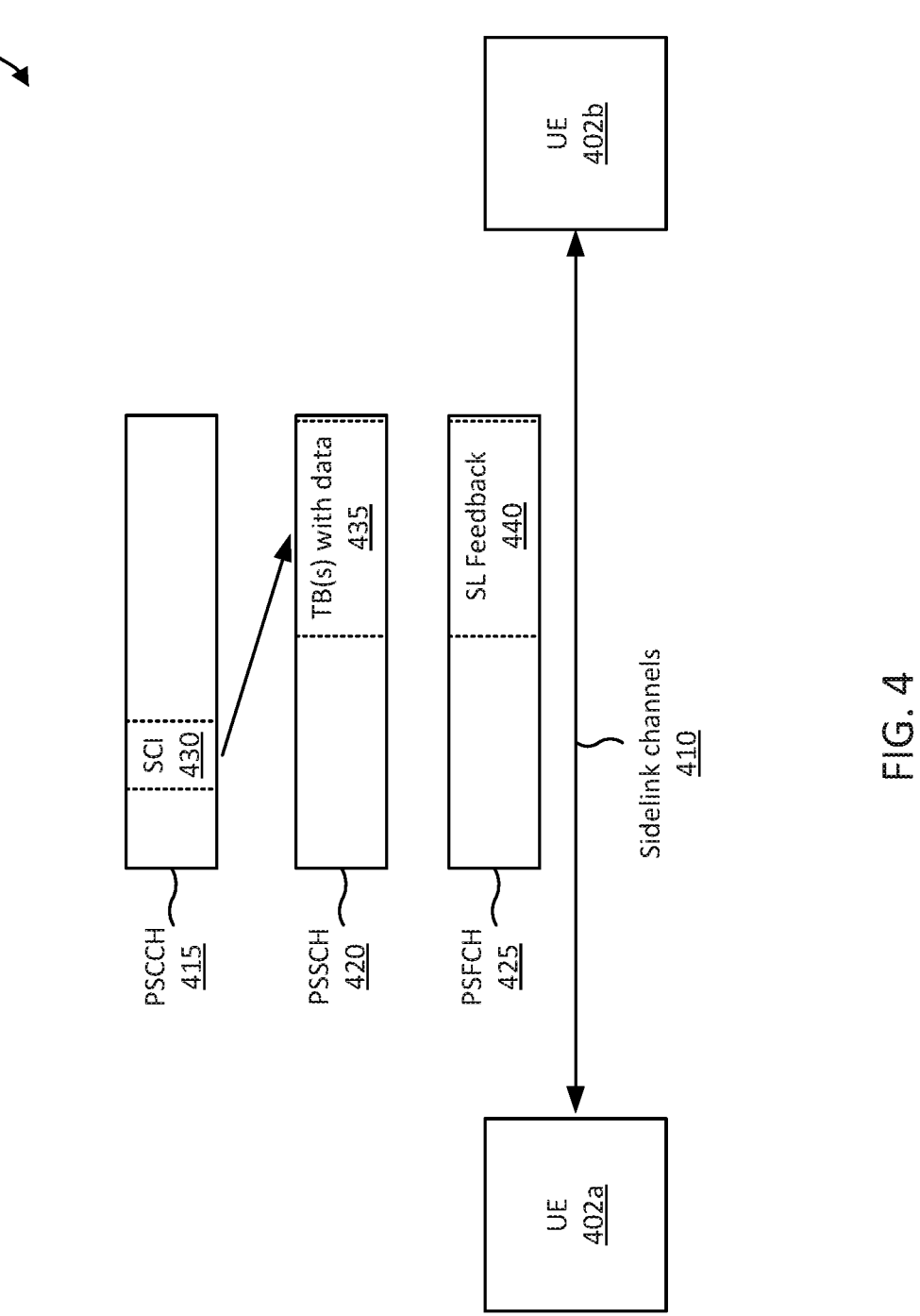
FIG. 4 illustrates a sidelink communication scheme according to some aspects of the present disclosure.

FIG. 4 illustrates a sidelink communication scheme 400 according to some aspects of the present disclosure. The scheme 400 may be employed by UEs such as the UEs 115 and 315 in a network such as the networks 100 and/or 300 for sidelink communications. As shown in FIG. 4, a first UE 402a may communicate with a second UE 402b (and one or more other UEs 402)) via one or more sidelink channels 410. The UEs 402 and 402b may communicate using the one or more sidelink channels 410 for P2P communications, D2D communications, V2X communications (e.g., which may include V2V communications, V2I communications, V2P communications, and/or the like), mesh networking, and/or the like. In some aspects, the UEs 402 (e.g., UE 402a and/or UE 402b) may correspond to one or more other UEs described elsewhere herein, such as UE 115 and/or 315. In some aspects, the one or more sidelink channels 410 may use a PC5 interface and/or may operate in a high frequency band (e.g., about 4 GHz, 5 GHz, 6 GHz, or mmWave band). Additionally, or alternatively, the UEs 402 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a PSCCH 415, a PSSCH 420, and/or a PSFCH 425. The PSCCH 415 may be used to communicate control information, similar to a PDCCH and/or a PUCCH used for cellular communications with a base station 110 via an access link or an access channel.

The PSSCH 420 may be used to communicate data, similar to a PDSCH and/or a PUSCH used for cellular communications with a base station 110 via an access link or an access channel. In some aspects, the PSCCH 415 may carry SCI 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as HARQ feedback (e.g., ACK/NACK information), transmit power control (TPC), a scheduling request (SR), and/or the like. In some aspects, the SCI 430 in the PSCCH 415 may include a first stage SCI (e.g., resource information) and the PSSCH 420 may carry a second stage SCI (e.g., transmission parameters such as MCS used for transmitting the data 435.

In some aspects, the one or more sidelink channels 410 may use resources from a sidelink resource pool. A sidelink resource pool may refer to a set of time resources (including a number of symbols similar to the symbols 206 or a number of slots similar to the slots 202) and frequency resources (including a number of subcarriers similar to the subcarriers 204 or a number of RBs similar to the RBs 210) that may be used for sidelink transmissions. In some aspects, a scheduling assignment (e.g., included in SCI 430) may be transmitted in sub-channels using specific RBs across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 402 may operate using a transmission mode where resource selection and/or scheduling is performed by the UE 402 (e.g., rather than a base station 105 or 305). In some aspects, the UE 402 may perform resource selection and/or scheduling by sensing channel availability for transmissions. In some aspects, the UE 402 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 402 may perform resource selection and/or scheduling using SCI 430 received in the PSCCH 415, which may indicate occupied resources, channel parameters, and/or the like. Additionally, or alternatively, the UE 402 may perform resource selection and/or scheduling by determining a channel busy rate (CBR) associated with various sidelink channels, which may be used for rate control (e.g., by indicating a maximum number of resource blocks that the UE 402 can use for a particular set of subframes).

In the transmission mode where resource selection and/or scheduling is performed by a UE 402, the UE 402 may generate sidelink grants, and may transmit the grants in SCI 430. A sidelink grant may indicate, in some aspects, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 402 may generate a sidelink grant that indicates one or more parameters for semi-persistent scheduling (SPS), such as a periodicity of a sidelink transmission. Additionally, or alternatively, the UE 402 may generate a sidelink grant for event-driven scheduling, such as for an on-demand sidelink message.

PSFCH resources may be from the sidelink resource pool. There may be a period for PSFCH transmission in the resource pool. In some aspects, the sidelink resource pool may include a plurality of slots, and the PSFCH resources may be allocated at every one, two, or four slots. In some aspects, in a slot including a PSFCH, the PSFCH resource may be located after a PSSCH and a minimum time gap (e.g., about 1 symbol) for PSFCH.

As indicated above, FIG. 4 is provided as an aspect. Other aspects may differ from what is described with respect to FIG. 4. Although FIG. 4 is illustrated for a P2P or unicast sidelink communication, it should be understood that in other examples similar mechanisms can be used for sidelink groupcast, where the data 435 may be addressed to multiple sidelink UEs similar to the UE 402b.

Figures 5A, 5B:
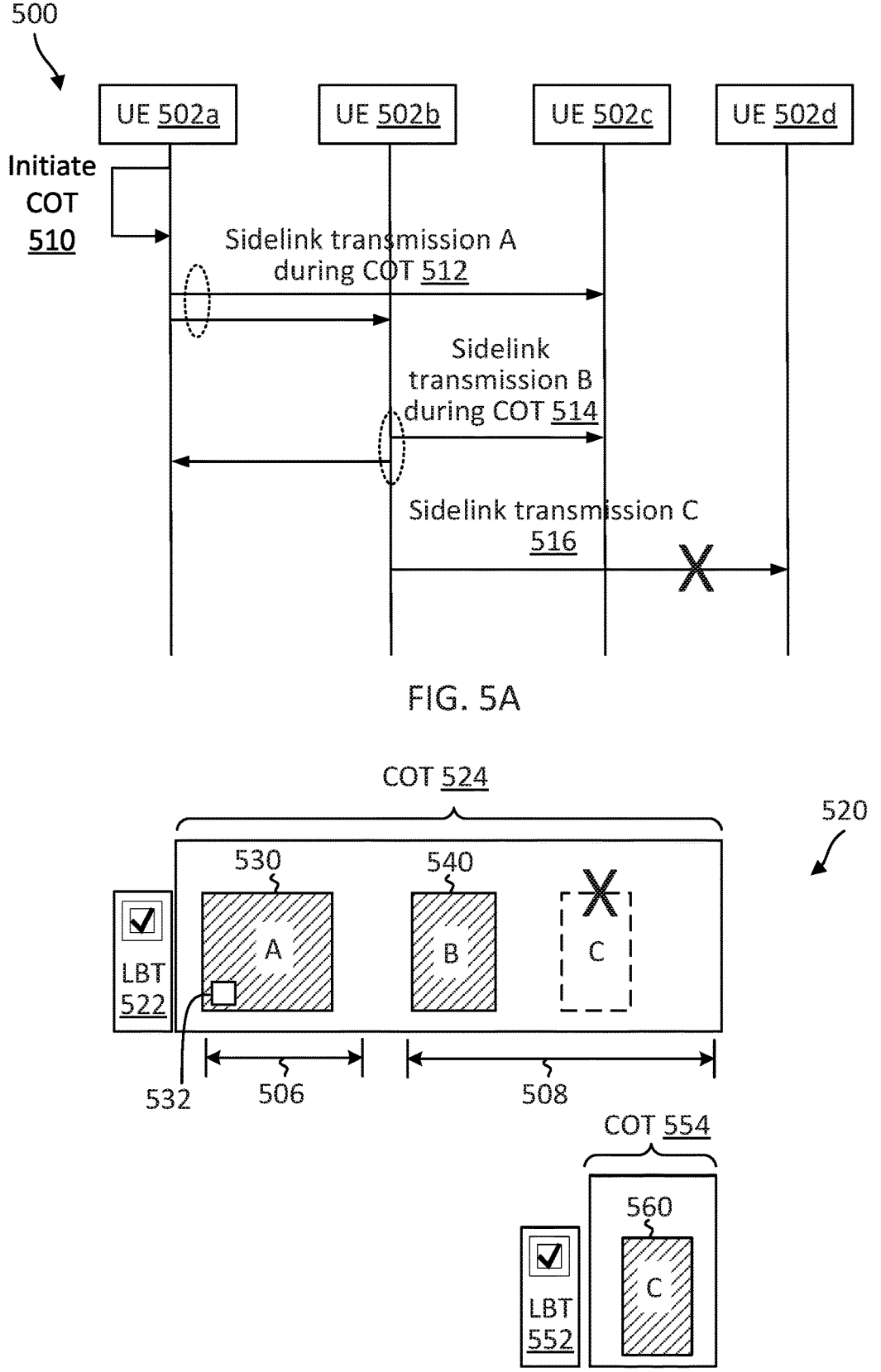
FIG. 5A is a sequence diagram illustrating a sidelink channel occupancy time (COT) sharing method according to some aspects of the present disclosure.
FIG. 5B is a timing diagram illustrating a sidelink COT sharing method according to some aspects of the present disclosure.

FIGS. 5A and 5B are discussed in relation to each other to illustrate COT sharing for sidelink groupcast. FIG. 5A is a sequence diagram illustrating a sidelink COT sharing method 500 according to some aspects of the present disclosure. The method 500 may be implemented among UE 502a, UE 502b, UE 502c, and UE 502d operating over a shared radio frequency band (e.g., in a shared spectrum or an unlicensed spectrum). The UEs 502a-d may be similar to the UEs 115, 315, and/or 402. FIG. 5B is a timing diagram 520 illustrating the sidelink COT sharing method 500 according to some aspects of the present disclosure. In FIG. 5B, the x-axis represents time in some arbitrary units.

At action 510, the UE 502a (e.g., an initiating UE) initiates a COT (shown as 524 in FIG. 5B) in the shared radio frequency band by performing a CAT4 LBT (shown as 522 in FIG. 5B) in the shared channel. For instance, the CAT4 LBT 522 is successful (indicating the channel is clear for transmission) as shown by the checkmark.

At action 512, upon passing the CAT4 LBT, the UE 502a transmits a sidelink transmission A (shown as 530 in FIG. 5B) during a portion 506 of the COT 524. The sidelink transmission A may include SCI (e.g., SCI 430) and data (e.g., data 435) as discussed above in relation to FIG. 4. The sidelink transmission A is a groupcast transmission, for example, with the UE 502b and the UE 502c as the intended recipients as shown by the two arrows grouped by the dashed oval. The UE 502b and the UE 502c (e.g., responding UEs) may receive the sidelink transmission A.

In some aspects, the sidelink transmission A may be a connection-based groupcast transmission, and the SCI may include a group identifier (ID) identifying a group in which the UE 502b and the UE 502c belong. Accordingly, the UE 502b and the UE 502c may receive the sidelink transmission A based on the SCI indicating the group ID. In some aspects, the sidelink transmission A may be a connectionless group-cast transmission and UEs and may be intended for UEs within a certain zone instead of based on a group ID. For instance, the UE 502b and the UE 502c may be within a certain zone (a geographical area or a physical distance range from the UE 502a), and thus may receive the sidelink transmission A. In some instances, zones can be preconfig-ured, and the UE 502b and the UE 502c may receive zone information (e.g., a zone ID identifying a zone associated with the UE 502a) in SCI within the sidelink transmission A. In some aspects, the sidelink transmission A may be a broadcast transmission, and any UEs including the UE 502b and the UE 502c that are in a neighborhood of the UE 502a may receive the sidelink transmission A.

The sidelink transmission A may include COT sharing information. As shown in FIG. 5B, the sidelink transmission A includes an indicator 532. The indicator 532 may indicate whether the sidelink transmission A 530 is transmitted by an initiating node (of the COT 524) or a responding node. In some aspects, the indicator 532 may have a length of 1 bit, where a bit-value of 1 may indicate an initiating node and a bit-value of 0 may indicate a responding node or vice versa. In some aspects, the indicator 532 may be part of a first stage SCI or part of a second stage SCI. In some aspects, the indicator 532 may be part of a COT-SI. For instance, the COT-SI may include a bitmap and the indicator 532 may correspond to a bit within the bitmap. In some instances, the COT-SI may indicate other information (e.g., a duration of the COT 524 for sharing such as the portion 508 shown in FIG. 5B) related to the COT 524.

In some aspects, a responding UE may be allowed to transmit a groupcast transmission in a shared portion of a COT if the UE that initiated the COT is an intended recipient of the groupcast transmission. For instance, after the UE 502b receives the sidelink transmission A, the UE 502b may desire to transmit a sidelink transmission B in a groupcast mode. Thus, the UE 502b may determine whether the initiating UE 502a is an intended recipient of the sidelink transmission B. At action 514, the UE 502b transmits the sidelink transmission B (shown as 540 in FIG. 5B) to the UE 502a and the UE 502c in a groupcast mode (as shown by the two arrows grouped by the dashed arrows) during a shared portion 508 of the COT 524 based on the initiating UE 502a being an intended recipient of the sidelink transmission B 540. The sidelink transmission B 540 may include SCI (e.g., SCI 430) and data (e.g., data 435) as discussed above in relation to FIG. 4. In some aspects, the portion shared portion 508 may be spaced apart from the portion 506 (non-shared portion) or may start at a certain symbol within the COT 524.

In some aspects, the UE 502b may perform a CAT2 LBT prior to transmitting the sidelink transmission B in the shared COT 524. In some aspects, the UE 502b may transmit the sidelink transmission B in the shared COT 524 without performing an LBT prior to the transmission. Accordingly, COT sharing can reduce LBT overhead and/or channel access uncertainty, and thus can provide efficient sidelink communications. In some aspects, the UE 502b may deter-mine whether to perform no LBT or a CAT2 LBT prior transmitting the sidelink transmission B in the shared COT 524 based on a gap duration between the sidelink transmis-sion B and a previous transmission in the COT. For instance, the UE 502b may transmit the sidelink transmission B without performing an LBT when the gap is short (e.g., shorted than a duration threshold).

In some aspects, the UE 502b may also desire to transmit a sidelink transmission C in a unicast mode to the UE 502d. The UE 502b may determine that the initiating UE 502a is not an intended recipient of the sidelink transmission C, and thus may not transmit the sidelink transmission C in the shared portion 508 of the COT 524. At action 516, the UE 502b refrains from transmitting the sidelink transmission C to the UE 502d during the COT 524 as shown by the arrow with the symbol "X" in FIG. 5A and the dashed box C with the symbol "X" in FIG. 5B. To transmit the sidelink trans-mission C, the UE 502b may perform a CAT4 LBT 552 in the shared channel to contend for a COT 554 and transmit the sidelink transmission C 560 upon passing the CAT4 LBT 552 (with the checkmark) as shown in FIG. 5B. The sidelink transmission C 560 may include SCI (e.g., SCI 430) and data (e.g., data 435) as discussed above in relation to FIG. 4.

Figures 6A, 6B:
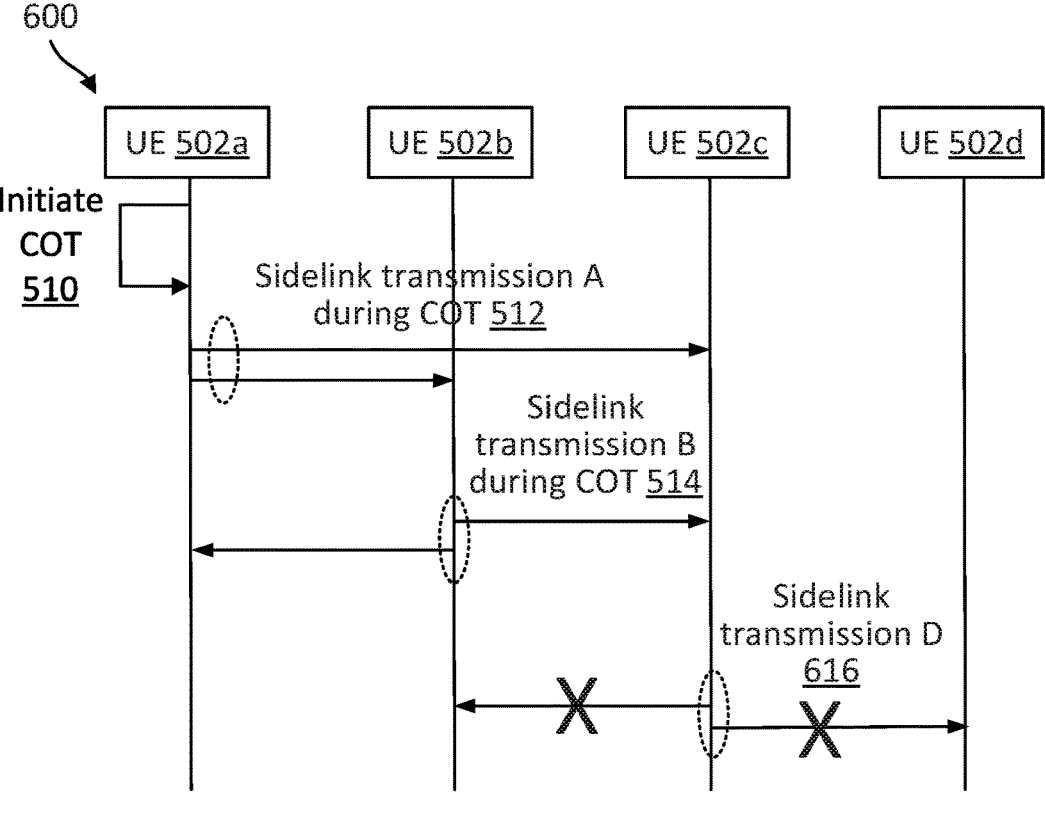
FIG. 6A is a sequence diagram illustrating a sidelink COT sharing method according to some aspects of the present disclosure.
FIG. 6B is a timing diagram illustrating a sidelink COT sharing method according to some aspects of the present disclosure.

FIGS. 6A and 6B are discussed in relation to each other to illustrate COT sharing for sidelink groupcast. FIG. 6A is a sequence diagram illustrating a sidelink COT sharing method 600 according to some aspects of the present dis-closure. The method 600 may be implemented among UE 502a, UE 502b, UE 502c, and UE 502d operating over a shared radio frequency band (e.g., in a shared spectrum or an unlicensed spectrum). The UEs 502a-d may be similar to the UEs 115 and/or 315. FIG. 6B is a timing diagram 620 illustrating the sidelink COT sharing method 600 according to some aspects of the present disclosure. In FIG. 6B, the x-axis represents time in some arbitrary units. The method 600 is substantially similar to the method 500 discussed above in relation to FIGS. 5A and 5B. However, in the method 600, the responding UE 502c of the sidelink trans-mission B may desire to transmit a sidelink transmission D in a groupcast mode after receiving the sidelink transmission B.

As discussed above, at action 514, the UE 502b transmits the sidelink transmission B 540 during the shared portion 508 of the COT 524 based on the initiating UE 502a of the COT 524 is an intended recipient of the sidelink transmis-sion B 540.

In some aspects, a UE receiving a sidelink transmission in a COT may transmit in a shared portion of the COT if the sidelink transmission is transmitted by a UE that initiated the COT. For instance, after receiving the sidelink transmission B from the UE 502b, the UE 502b may desire to transmit a sidelink transmission D in a groupcast mode and may determine whether the sidelink transmission D can be trans-mitted during the COT 524. The UE 502b may determine whether the UE 502b is an initiating UE of the COT 524.

To assist a responding UE of the sidelink transmission B 540 to determine whether the COT 524 can be shared, the UE 502*b* may include an indicator 642 in the sidelink transmission B 540 as shown in FIG. 6B. The indicator 642 may be substantially similar to the indicator 532, but may indicate that the sidelink transmission B 540 is transmitted by a responding UE of the COT 524. Accordingly, the UE 502*c* that received the sidelink transmission B may decode the indicator 642 and be aware that the sidelink transmission B is received from a responding UE (e.g., the UE 502*b*) of the COT 524, and not an initiating UE of the COT 524. Accordingly, the UE 502*c* may determine that it may not share the COT 524 for transmitting the sidelink transmission D.

At action 616, upon determining that the COT 524 is not for sharing by the UE 502*c*, the UE 502*c* refrains from transmitting the sidelink transmission D during the COT 524 as shown by the arrow with the symbol "X" in FIG. 6A and the dashed box D with the symbol "X" in FIG. 6B. To transmit the sidelink transmission D, the UE 502*c* may perform a CAT4 LBT 652 in the shared channel to contend for a COT 654 and transmit the sidelink transmission D 660 upon passing the CAT4 LBT 652 (with the checkmark) as shown in FIG. 6B. The sidelink transmission D 660 may include SCI (e.g., SCI 430) and data (e.g., data 435) as discussed above in relation to FIG. 4.

As can be observed, irrespective of whether the sidelink transmission D 660 is intended to be received by the UE 502*b* that transmitted the sidelink transmission B 540, the UE 502*c* may not transmit the sidelink transmission D 660 during the COT 524 because the UE 502*b* is not an initiating UE of the COT 524.

Further, disallowing the UE 502*c* from sharing the COT 524 based on the UE 502 received the sidelink transmission B during a COT 524 from a responding node of the COT 524 can avoid the COT sharing to propagate from the UE 502*b* to the UE 502*c* (based on the sidelink transmission B 540), from the UE 502*c* to the UE 502*d* (based on the sidelink transmission D 660, and so on. Avoiding COT sharing to propagate can allow for a fairer channel access among different wireless communication devices of the same RAT or different RATs sharing the same channel instead of starving other wireless communication devices of channel access opportunities.

FIG. 7 is a flow diagram of a sidelink COT sharing method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UEs 115, 315, 402, or 502 may utilize one or more components, such as the processor 1102, the memory 1104, the sidelink COT sharing module 1108, the transceiver 1110, the modem 1112, and the one or more antennas 1116, to execute the steps of method 700. The method 700 may employ similar mechanisms as described above in FIGS. 1-4, 5A-5B, and 6A-6B. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a first UE (e.g., the UE 115, 315, 502, or 1100) receives, from a second UE, a first sidelink transmission during a COT (e.g., the COT 524) in a shared channel.

The first sidelink transmission may include SCI (e.g., SCI 430) and data (e.g., data 435) as discussed above in relation to FIG. 4.

At block 720, the first UE determines whether the COT is for sharing. For instance, the first sidelink transmission may include COT sharing information similar to the indicators 532 and/or 642. In some aspects, the COT sharing information may indicate whether the COT sharing in the first COT is allowed. In some aspects, the COT sharing information may indicate whether the first sidelink transmission is transmitted by an initiating UE of the COT. If the COT sharing information indicates that the first sidelink transmission is transmitted by an initiating UE of the COT, the COT is for sharing by a responding UE of the first sidelink transmission. If, however, the COT sharing information indicates that the first sidelink transmission is transmitted by a responding UE of the COT, the COT is not for sharing by a responding UE of the first sidelink transmission. Accordingly, the first UE may determine whether the COT is for sharing based on the COT sharing information. If the first UE determines that the COT is for sharing, the first UE proceeds to block 730.

At block 730, the first UE determines whether the second UE is one of two or more UEs (e.g., a group of UEs) intended to receive a second sidelink transmission. In some aspects, the first UE may determine to transmit the second sidelink transmission in a connection-based groupcast mode to a specific group of receiving UEs (e.g., about 2, 3, 4, 5, 6 or more), and thus may determine whether the second UE is in the specific group. In some aspects, the first UE may determine to transmit the second sidelink transmission in a connectionless groupcast mode, and may determine whether the second UE is an intended recipient based on a zone associated with the second UE. The zone may be based on a geographical location of the second UE or a physical distance between the first UE and the second UE. In some instances, zones can be preconfigured, and the second UE may include zone information (e.g., a zone ID identifying a zone associated with the second UE) in SCI within the first sidelink transmission. If the first UE determines that the second UE is one of the two or more UEs intended to receive the second sidelink transmission, the first UE proceeds to block 740.

At block 740, the first UE transmits the second sidelink transmission to the two or more UEs during the shared portion (e.g., the portion 508) of the COT based on COT sharing. The COT sharing may be in response to determining the second UE is one of the two or more UEs intended to receive the second sidelink transmission. The first UE may identify the shared portion (e.g., a duration) from the COT sharing information carried in the first sidelink transmission. The second sidelink transmission may include SCI (e.g., SCI 430) and data (e.g., data 435) as discussed above in relation to FIG. 4.

Returning to block 720, if the first UE determines that the COT is not for sharing, the first UE proceeds to block 750. At block 750, the first UE refrains from transmitting the second sidelink transmission during the shared portion of the COT. For instance, the first UE may instead initiate a second COT by performing a CAT4 LBT in the shared channel and transmit the second sidelink transmission during the second COT upon passing the CAT4 LBT.

Returning to block 730, if the first UE determines that the second UE is not one of the two or more UEs intended to receive the second sidelink transmission, the first UE proceeds to block 750.

Figure 8A:
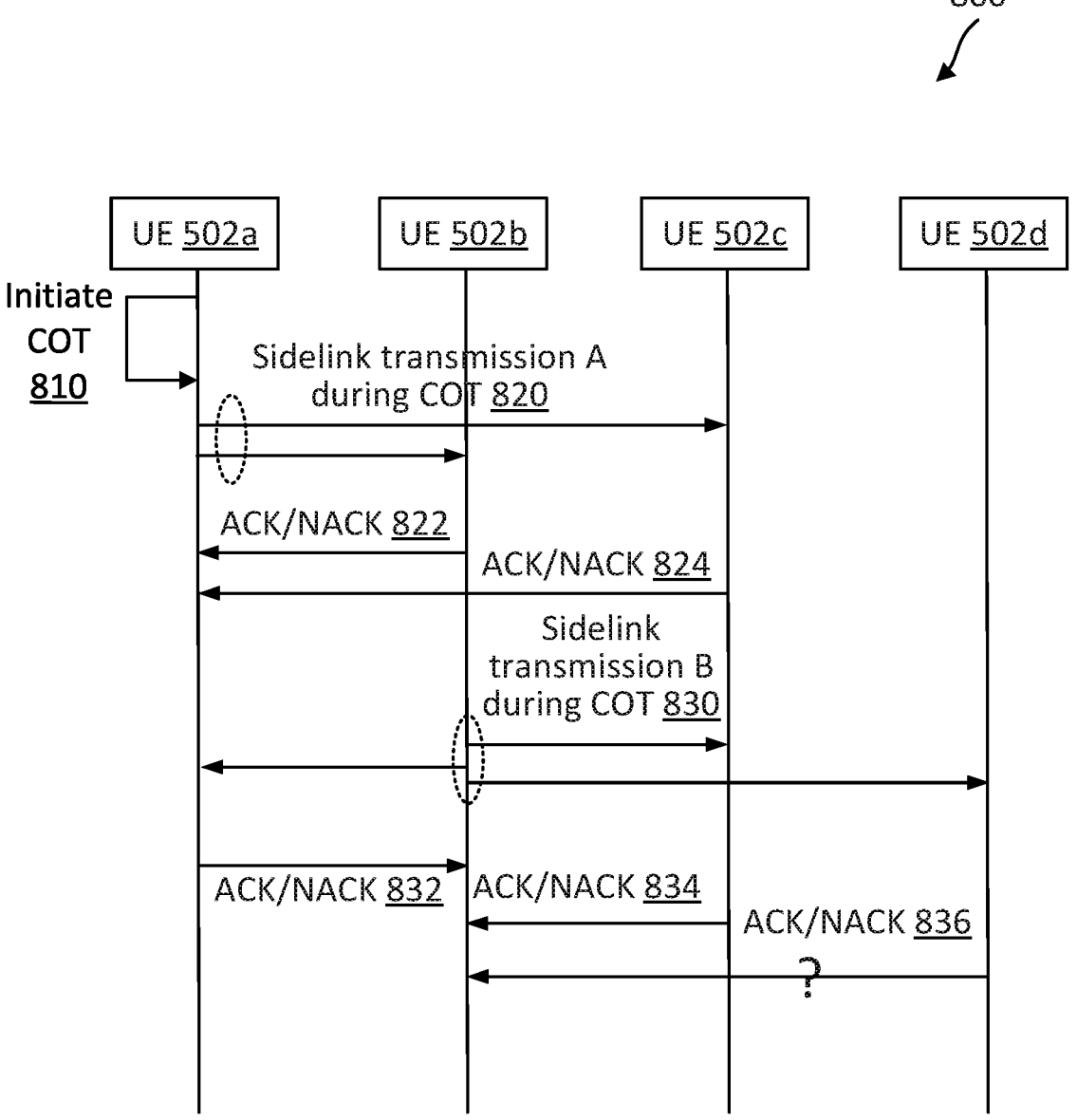
FIG. 8A is a sequence diagram illustrating a sidelink COT sharing method according to some aspects of the present disclosure.
Figure 8B:
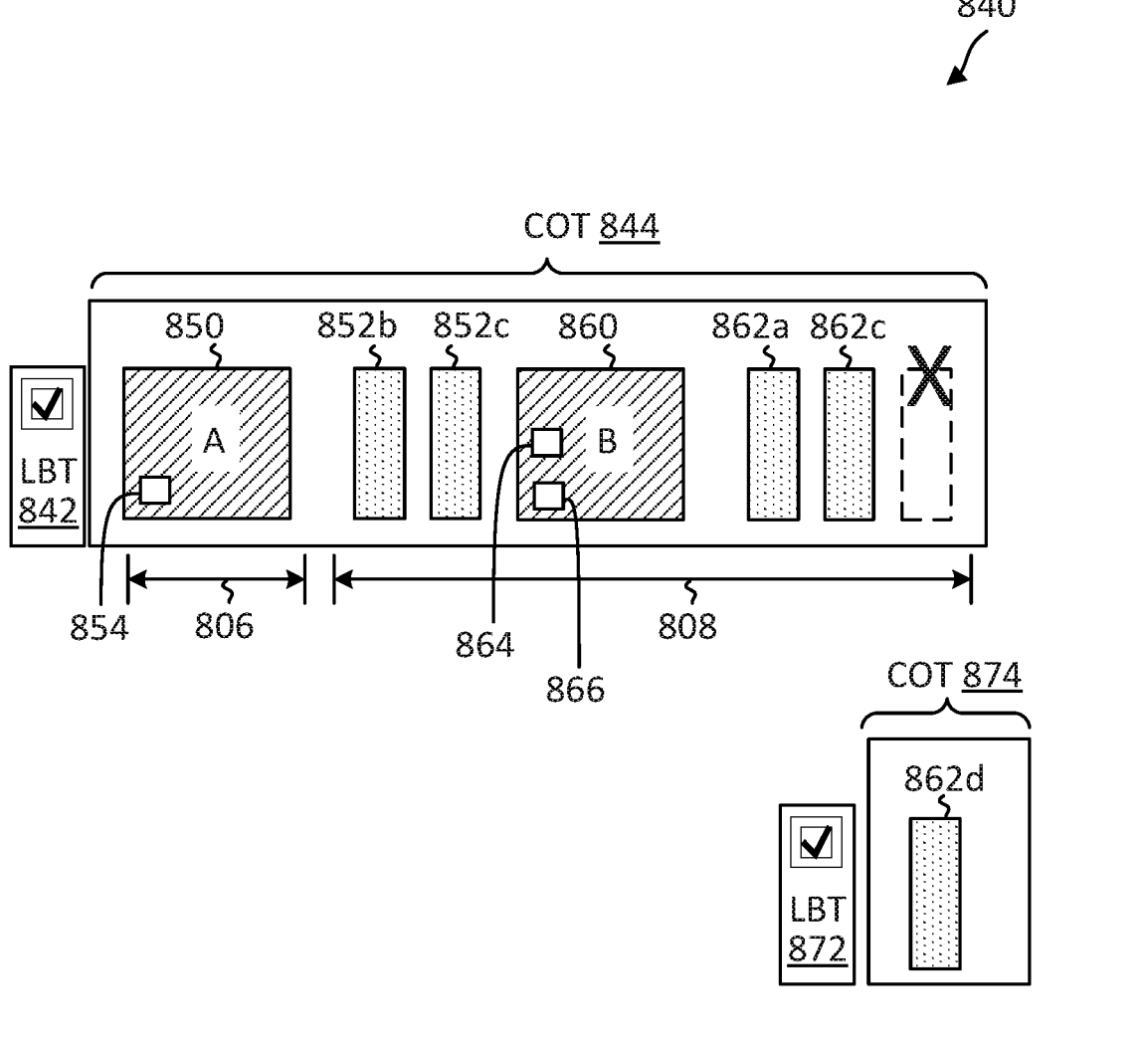
FIG. 8B is a timing diagram illustrating a sidelink COT sharing method according to some aspects of the present disclosure.

FIGS. 8A and 8B are discussed in relation to each other to illustrate COT sharing for sidelink groupcast. FIG. 8A is a sequence diagram illustrating a sidelink COT sharing method 800 according to some aspects of the present disclosure. The method 800 may be implemented among UE 502*a*, UE 502*b*, UE 502*c*, and UE 502*d* operating over a shared radio frequency band (e.g., in a shared spectrum or an unlicensed spectrum). The UEs 502*a-d* may be similar to the UEs 115 and/or 315. FIG. 8B is a timing diagram 840 illustrating the sidelink COT sharing method 800 according to some aspects of the present disclosure. In FIG. 8B, the x-axis represents time in some arbitrary units.

The method 800 is substantially similar to the methods 500, 600 and 700 and may employ mechanisms as in the methods 600 and 700 discussed above with reference to FIGS. 5A-5B, 6A-6B, and 7, respectively. The method 800 further illustrates how a responding UE of a sidelink transmission may transmit ACK/NACK feedbacks (e.g., the feedback 440 in the PSFCH 425) with COT sharing. As explained above, a sidelink transmitting UE may request an ACK/NACK feedback for a unicast sidelink transmission or a connection-based sidelink transmission from an intended receiving UE or responding UE. A sidelink transmitting UE may also request an NACK-only feedback for a connection-less groupcast transmission from an intended receiving UE or responding UE. In the method 800, a responding UE receiving a sidelink transmission in a COT may transmit an ACK/NACK feedback in a shared portion of the COT if the responding UE can detect COT sharing information from the initiating UE of the COT, and not based on whether the sidelink transmission is transmitted by an initiating UE of the COT. In other words, COT sharing for PSFCH transmission is independent from COT sharing for PSSCH transmission. Although the method 800 is described in the context of ACK/NACK transmission with COT sharing in a groupcast transmission scenario, it should be understood that in other examples similar mechanisms may be applied to ACK/NACK transmission in a unicast transmission scenario.

As shown, at action 810, the UE 502*a* (e.g., an initiating UE) initiates a COT (shown as 844 in FIG. 8B) by performing a CAT4 LBT (shown as 842 in FIG. 8B) in the shared channel. For instance, the CAT4 LBT 842 is successful (indicating the channel is clear for transmission) as shown by the checkmark.

At action 820, upon passing the CAT4 LBT, the UE 502*a* transmits a sidelink transmission A (shown as 850 in FIG. 8B) during a portion 806 of the COT 844. The sidelink transmission A may include SCI (e.g., SCI 430) and data (e.g., data 435) as discussed above in relation to FIG. 4. The sidelink transmission A is a groupcast transmission, for example, with the UE 502*b* and the UE 502*c* as the intended recipients as shown by the two arrows grouped by the dashed oval. The UE 502*b* and the UE 502*c* (e.g., responding UEs) may receive the sidelink transmission A.

As an example, the sidelink transmission A may be a connection-based groupcast transmission, and the UE 502*a* may request an ACK/NACK feedback for the sidelink transmission A from each of the intended recipients. In some aspects, the UE 502*a* may include a PSFCH resource allocation indication (e.g., carried in the SCI) in the sidelink transmission A for each of the intended recipients to transmit an NACK/NACK feedback. In some instances, the UE 502*a* may transmit the data in a PSSCH region of a slot and may indicate different PSFCH resources in a PSFCH region of the slot for different UEs. In some examples, the slot may include 14 symbols indexed from 0 to 13, the PSSCH region may include symbol 1 to symbol 9 of the slot, and the PSFCH region may include symbol 11 and symbol 12 of the slot. The different PSFCH resources for the different intended recipients may be FDM, TDM, and/or code-division-multiplexed (CDM) in the PSFCH region.

Similar to the methods 500 and 600, the UE 502*a* may include an indicator 854 in the sidelink transmission A to provide COT sharing information related to the COT 844. The indicator 854 may indicate whether the sidelink transmission A 850 is transmitted by an initiating UE (of the COT 844) or a responding UE (of the COT 844). In some aspects, the indicator 854 may have a length of 1 bit, where a bit-value of 1 may indicate an initiating node and a bit-value of 0 may indicate a responding node or vice versa. In some aspects, the indicator 854 may be part of a first stage SCI or part of a second stage SCI. In some aspects, the indicator 854 may be part of a COT-SI. For instance, the COT-SI may include a bitmap and the indicator 854 may correspond to a bit within the bitmap. In some instances, the COT-SI may indicate other information (e.g., a duration of the COT 844 for sharing such as the portion 808 shown in FIG. 8B) related to the COT 844.

At action 822, upon receiving the sidelink transmission A at the UE 502*b*, the UE 502*b* transmits an ACK/NACK feedback to the UE 502*a*. The UE 502*b* may transmit an ACK if the UE 502*b* successfully decoded data from the sidelink transmission A 850. Conversely, the UE 502*b* may transmit an NACK if the UE 502*b* detected the presence of the sidelink transmission A 850 (based on successful SCI decoding), but fails to decode data from the sidelink transmission A 850. In some aspects, the UE 502*b* may transmit a certain predetermined waveform sequence to indicate an ACK, and may transmit a different predetermined waveform sequence to indicate an NACK. Since the UE 502*b* is to transmit the ACK/NACK feedback to the UE 502*a* that initiated the COT 844, the UE 502*b* may transmit the ACK/NACK feedback (shown as 852*b*) during a shared portion 808 of the COT 844 as shown in FIG. 8B. The UE 502*b* may transmit the ACK/NACK feedback 852*b* using a PSFCH resource as indicated by the sidelink transmission A 850.

At action 824, upon receiving the sidelink transmission A at the UE 502*c*, the UE 502*c* transmits an ACK/NACK feedback to the UE 502*a*. The UE 502*c* may transmit an ACK or an NACK depending on whether the UE 502*c* is successful in decoding data from the sidelink transmission A 850 or not. Since the UE 502*c* is to transmit the ACK/NACK feedback to the UE 502*a* that initiated the COT 844, the UE 502*c* may transmit the ACK/NACK feedback (shown as 852*c*) during the shared portion 808 of the COT 844 as shown in FIG. 8B. The UE 502*c* may transmit the ACK/NACK feedback 852*b* using a PSFCH resource as indicated by the sidelink transmission A 850.

Similar to the methods 500 and/or 600, after the UE 502*b* receives the sidelink transmission A, the UE 502*b* may desire to transmit a sidelink transmission B in a groupcast mode to the UE 502*a*, the UE 502*c* and the UE 502*d* (e.g., a group of UEs identified by a group ID). The UE 502*b* may determine that the initiating UE 502*a* is an intended recipient of the sidelink transmission B. Thus, at action 830, the UE 502*b* transmits the sidelink transmission B (shown as 860 in FIG. 8B) to the UE 502*a*, the UE 502*c*, and the UE 502*d* in a groupcast mode (as shown by the three arrows grouped by the dashed arrows) during a shared portion 508 of the COT 524. The sidelink transmission B 860 may include SCI (e.g., SCI 430) and data (e.g., data 435) as discussed above in relation to FIG. 4. In some aspects, the UE 502*b* may include a PSFCH resource allocation indication (e.g., carried in the SCI) in the sidelink transmission B 860 for each of the intended recipients to transmit an NACK/NACK feedback as discussed above in relation to the sidelink transmission A at action 820. In some aspects, the sidelink transmission B 860 may also include an indicator 864 similar to the indicator 854, for example, indicating that the sidelink transmission B 860 is transmitted by a responding UE of the COT 844.

At action 832, upon receiving the sidelink transmission B at the UE 502*a*, the UE 502*a* transmits an ACK/NACK feedback to the UE 502*b*. The UE 502*a* may transmit an ACK or an NACK depending on whether the UE 502*a* is successful in decoding data from the sidelink transmission A 850 or not. Since the COT 844 is initiated by the UE 502*a*, the UE 502*a* may transmit the ACK/NACK feedback (shown as 862*a*) during the shared portion 808 of the COT 844 as shown in FIG. 8B. The UE 502*a* may transmit the ACK/NACK feedback 862*a* using a PSFCH resource as indicated by the sidelink transmission B 860.

At action 834, upon receiving the sidelink transmission B at the UE 502*c*, the UE 502*c* transmits an ACK/NACK feedback to the UE 502*b*. The UE 502*c* may transmit an ACK or an NACK depending on whether the UE 502*c* is successful in decoding data from the sidelink transmission A 850 or not. In some aspects, the UE 502*c* may monitor for a COT sharing indication, and may determine whether to transmit the ACK/NACK feedback in the COT 844 based on whether a COT sharing indication is detected for the COT 844. As an example, the UE 502*c* may be located at a location nearby the UE 502*a* and may detect the COT sharing information (the indicator 854) related to the COT 844 during which the sidelink transmission B 860 is received. Accordingly, the UE 502*c* may transmit the ACK/NACK feedback (shown as 862*c*) during a shared portion 808 of the COT 844 as shown in FIG. 8B.

At action 836, upon receiving the sidelink transmission B at the UE 502*d*, the UE 502*d* transmits an ACK/NACK feedback to the UE 502*b*. The UE 502*c* may transmit an ACK or an NACK depending on whether the UE 502*d* is successful in decoding data from the sidelink transmission A 850 or not. In some aspects, the UE 502*d* may monitor for a COT sharing indication, and may determine whether to transmit the ACK/NACK feedback in the COT 844 based on whether a COT sharing indication is detected for the COT 844. As an example, the UE 502*d* may be located further away from the UE 502*a* and may not detect the COT sharing information (the indicator 854) related to the COT 844 during which the sidelink transmission B 860 is received, and thus may refrain from transmitting the ACK/NACK feedback during the shared portion 806 of the COT 844 as shown by the arrow with the symbol "X" in FIG. 8A and the dashed box with the symbol "X" in FIG. 8B. To transmit the ACK/NACK feedback, the UE 502*d* may perform a CAT4 LBT 872 in the shared channel to contend for a COT 874 and transmit the ACK/NACK feedback 862*d* upon passing the CAT4 LBT 872 (with the checkmark) as shown in FIG. 8B.

As can be observed in the method 800, when a responding UE (e.g., the UE 502*b*) shared a COT for a sidelink transmission (unicast or groupcast), the responding UE may not be aware of whether a receiving UE of the sidelink transmission may detect COT sharing information of the COT since each receiving UE may experience different interference. As such, the responding UE may include a channel access type indicator of CAT4 LBT in the sidelink transmission and let the receiving UE to select whether to share the COT for an ACK/NACK transmission. For instance, if the receiving UE cannot detect COT sharing information for the COT, the receiving UE may perform a CAT4 LBT in the shared channel to contend for another COT and transmit the ACK/NACK during the other COT upon passing the CAT4 LBT. If, however, the receiving UE detected the COT sharing information for COT, the receiving UE may perform no LBT or a CAT2 LBT prior to transmitting the ACK/NACK in the COT. For instance, the UE 502*b* may include a channel access type indicator 866 in the sidelink transmission B 860 as shown in FIG. 8B. The channel access type indicator 866 may indicate a CAT4 LBT for ACK/NACK transmission. For instance, the UE 502*c* may switch to perform a CAT2 LBT prior to transmitting the ACK/NACK at action 822 at action 822 based on the UE 502*c* detected the indicator 854 with COT sharing information for the COT 844.

Figure 9:
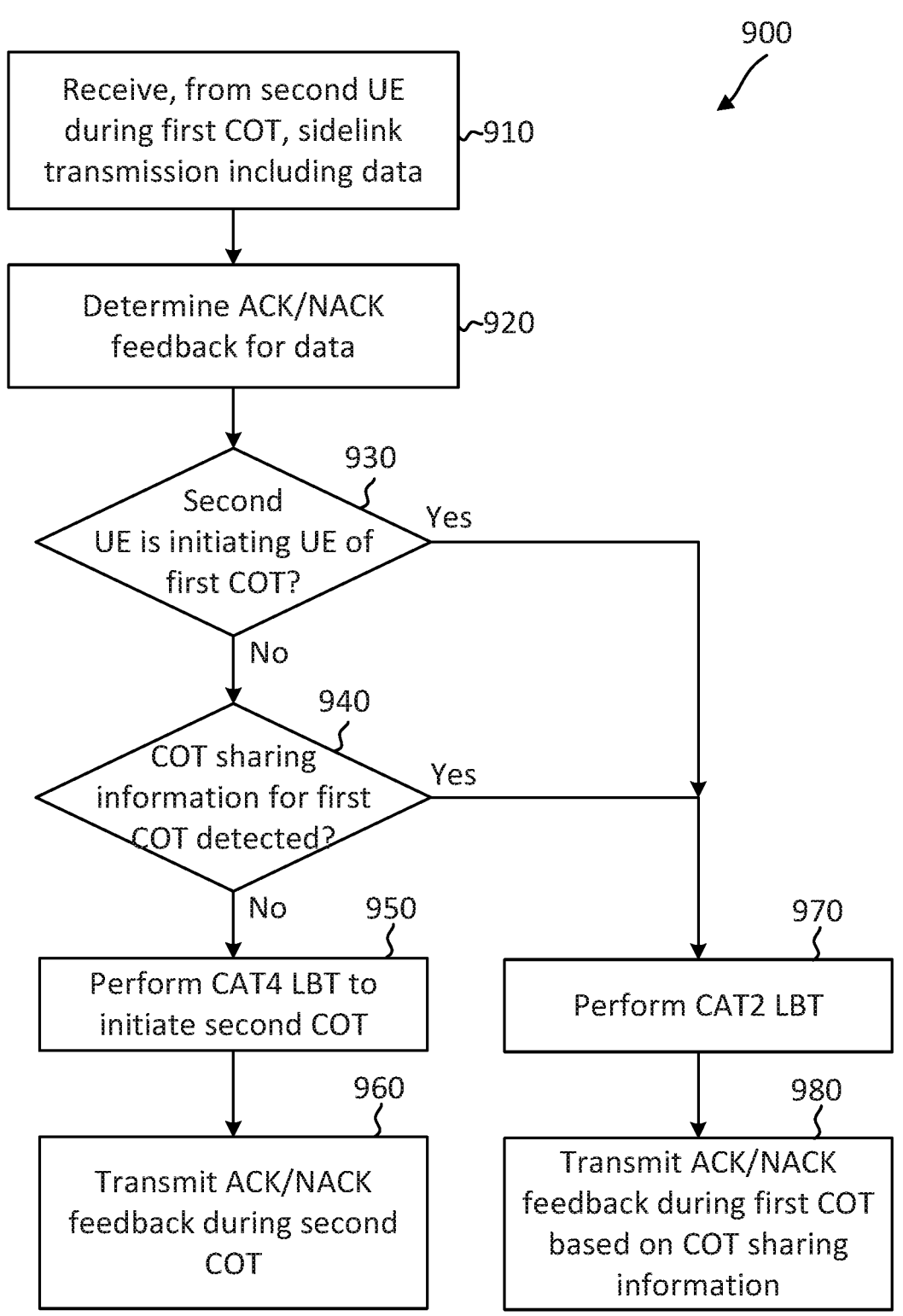
FIG. 9 is a flow diagram of a sidelink COT sharing method according to some aspects of the present disclosure.

FIG. 9 is a flow diagram of a sidelink COT sharing method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 315, or 502 may utilize one or more components, such as the processor 1102, the memory 1104, the sidelink COT sharing module 1108, the transceiver 1110, the modem 1112, and the one or more antennas 1116, to execute the steps of method 900. The method 900 may employ similar mechanisms as described above in FIGS. 1-4 and 8A-8B. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a first UE (e.g., the UE 115, 315, 402, 502, or 1100) receives, from a second UE, a first sidelink transmission during a COT (e.g., the COT 524) in a shared channel. The first sidelink transmission may include SCI (e.g., SCI 430) and data (e.g., data 435) as discussed above in relation to FIG. 4. The first UE may successfully decode the SCI, and may perform decoding to decode the data from the first sidelink transmission. In some aspects, the first sidelink transmission may be a unicast transmission. In some aspects, the first sidelink transmission may be a groupcast transmission. The first sidelink transmission may also include PSFCH resource allocation information for a receiving UE to transmit an ACK/NACK feedback for the first sidelink transmission.

At block 920, the first UE determines an ACK/NACK feedback for the first sidelink transmission. For instance, the UE may perform data decoding on the first sidelink transmission. The first UE may generate an ACK (e.g., a waveform sequence representing an ACK) if the first UE successfully decoded data from the first sidelink transmission. Conversely, the first UE may generate an NACK (e.g., a waveform sequence representing an NACK) if the first UE fails to decode data from the first sidelink transmission.

At block 930, the first UE determines whether the second UE is an initiating UE of the first COT. To assist a responding UE of the first sidelink transmission to determine whether the first COT can be shared, the first sidelink transmission may include a COT-SI indicator (e.g., the indicators 532, 642, and/or 864) indicating whether the first sidelink transmission is transmitted by an initiating UE of the first COT. The COT-SI may be part of the SCI in the first sidelink transmission. The COT-SI indicator may also include an indication of a duration in the first COT that is for sharing. Accordingly, the first UE may determine whether the second UE is an initiating UE of the first COT based on the indicator. If the first UE determines that the second UE is an initiating UE of the first COT, the first UE proceeds to block 970.

At block 970, in response to determining the second UE is an initiating UE of the first COT, the first UE performs a CAT2 LBT prior to transmitting the ACK/NACK in the COT. The first UE may perform the CAT2 LBT based on the ACK/NACK is to be transmitted within a shared portion of the first COT. In some other instances, the first UE may not perform an LBT prior to transmitting in a shared COT.

At block 980, upon passing the CAT2 LBT, the first UE transmits the ACK/NACK feedback for the first sidelink transmission during a shared portion of the first COT. The first UE may obtain information related to a duration of the shared portion from the COT-SI indicator.

Returning to block 930, if the first UE determines that the second UE is not an initiating UE of the first COT, the first UE proceeds to block 940. At block 940, the first UE determines whether COT sharing information for the first COT is detected. For instance, the first UE may monitor for COT-SI or COT sharing information from other UEs, for example, by performing SCI decoding at each PSCCH resource in a sidelink resource pool. Upon successfully decoding an SCI, the first UE may read the information in the SCI. The first UE may determine whether COT sharing information for the first COT is detected based on information read from the decoded SCI. If the first UE determines that COT sharing information for the first COT is detected, the first UE proceeds to block 970.

If the first UE determines that there is no COT sharing information detected for the first COT, the first UE proceeds to block 950. At block 950, the first UE performs a CAT4 LBT in the shared channel to contend for a second COT. For instance, the CAT4 LBT is a pass (indicating the channel is clear for transmission).

At block 960, upon pass the CAT4 LBT, the first UE transmits the ACK/NACK feedback during the second COT.

Figure 10:
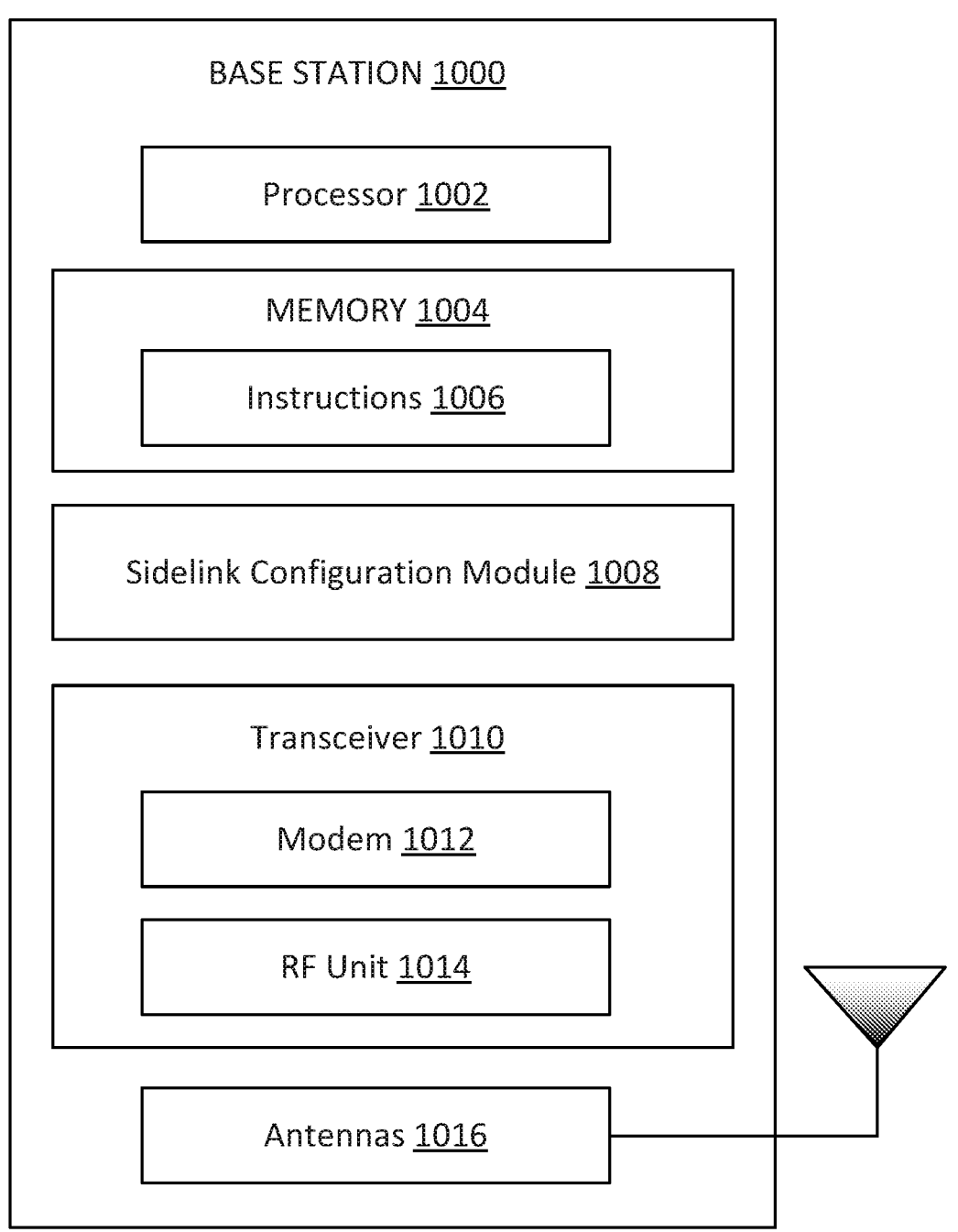
FIG. 10 is a block diagram of an exemplary base station (BS) according to some aspects of the present disclosure.

FIG. 10 is a block diagram of an exemplary BS 1000 according to some aspects of the present disclosure. The BS 1000 may be a BS 105 in the network 100 as discussed above in FIG. 1 or a BS 305 in the network 300. A shown, the BS 1000 may include a processor 1002, a memory 1004, an sidelink configuration module 1008, a transceiver 1010 including a modem subsystem 1012 and a RF unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to the UEs 115 in connection with aspects of the present disclosure, for example, aspects of FIGS. 1-3. Instructions 1006 may also be referred to as program code, which may be interpreted broadly to include any type of computer-readable statement(s).

The sidelink configuration module 1008 may be implemented via hardware, software, or combinations thereof. For example, the sidelink configuration module 1008 may be implemented as a processor, circuit, and/or instructions 1006 stored in the memory 1004 and executed by the processor 1002. In some examples, the sidelink configuration module 1008 can be integrated within the modem subsystem 1012. For example, the sidelink configuration module 1008 can be implemented by a combination of software components (e.g., executed by a DSP or a general processor) and hardware components (e.g., logic gates and circuitry) within the modem subsystem 1012.

The sidelink configuration module 1008 may communicate with various components of the BS 1000 to perform various aspects of the present disclosure, for example, aspects of FIGS. 1-3. For example, the sidelink configuration module 1008 is configured to configure UEs (e.g., the UEs 115, 315, 402, and 502) with sidelink resource pools for sidelink communications and/or configure certain UEs as anchor UEs as discussed above.

As shown, the transceiver 1010 may include the modem subsystem 1012 and the RF unit 1014. The transceiver 1010 can be configured to communicate bi-directionally with other devices, such as the UEs 115 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., RRC configuration, sidelink resource pools configurations) from the modem subsystem 1012 (on outbound transmissions) or of transmissions originating from another source such as a UE 115. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 105 to enable the BS 105 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, transmission of information to complete attachment to a network and communication with a camped UE 115 according to some aspects of the present disclosure. The antennas 1016 may further receive data messages transmitted from other devices and provide the received data messages for processing and/or demodulation at the transceiver 1010. The transceiver 1010 may provide the demodulated and decoded data to the sidelink configuration module 1008 for processing. The antennas 1016 may include multiple antennas of similar or different designs in order to sustain multiple transmission links.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

Figure 11:
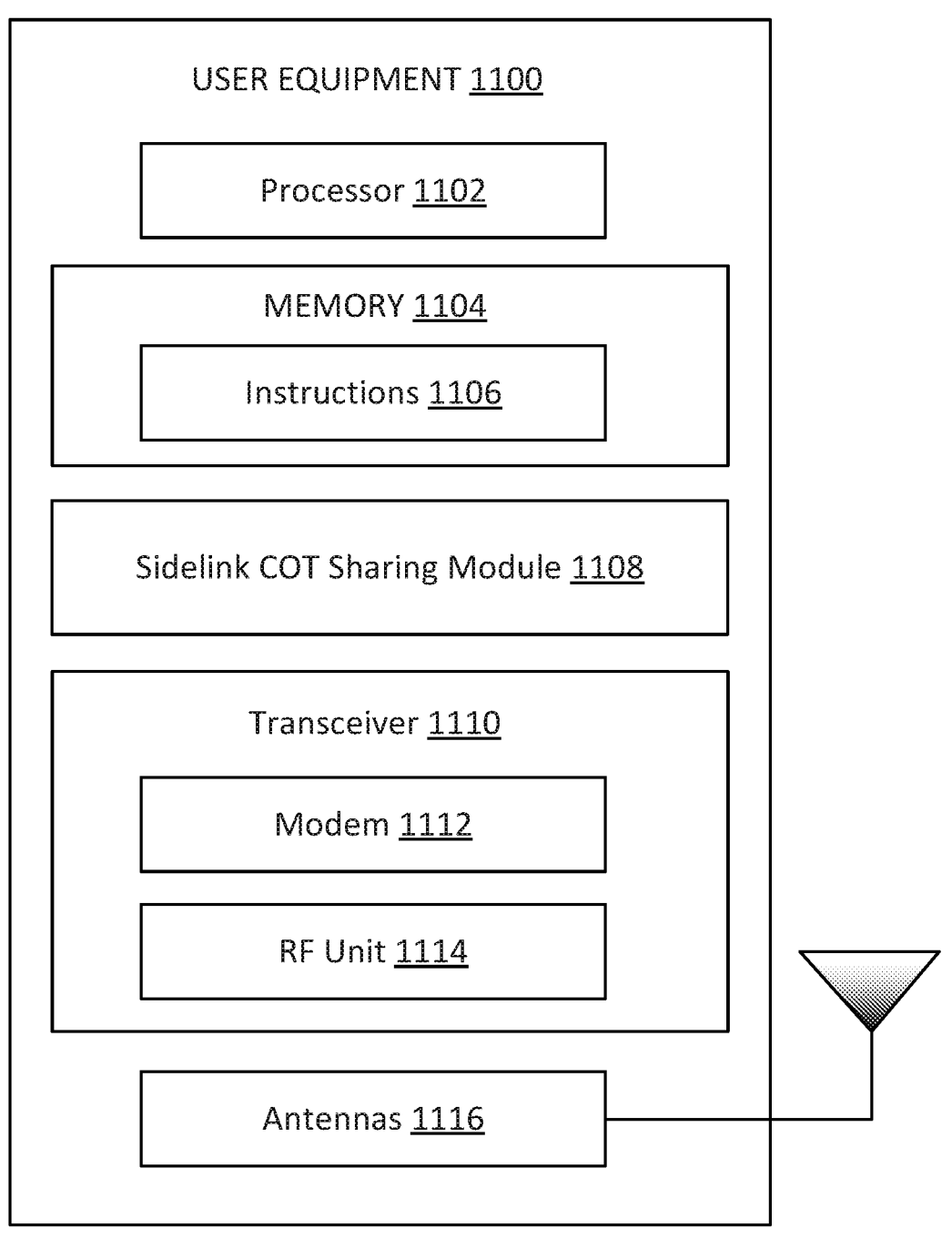
FIG. 11 is a block diagram of an exemplary user equipment (UE) according to some aspects of the present disclosure.

FIG. 11 is a block diagram of an exemplary UE 1100 according to some aspects of the present disclosure. The UE 1100 may be a UE 115 as discussed above with respect to FIG. 1, a UE 315 as discussed above with respect to FIG. 3, or a UE 502 as discussed above with respect to FIGS. 4, 5A-5B, 6A-6B, and 8A-8B. As shown, the UE 1100 may include a processor 1102, a memory 1104, a sidelink COT sharing module 1108, a transceiver 1110 including a modem subsystem 1112 and a radio frequency (RF) unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-3, 4, 5A-5B, 6A-6B, 7, 8A-8B, 9, and 12. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements as discussed above with respect to FIG. 10.

The sidelink COT sharing module 1108 may be implemented via hardware, software, or combinations thereof. For example, the sidelink COT sharing module 1108 may be implemented as a processor, circuit, and/or instructions 1106 stored in the memory 1104 and executed by the processor 1102. In some examples, the sidelink COT sharing module 1108 can be integrated within the modem subsystem 1112. For example, the sidelink COT sharing module 1108 can be implemented by a combination of software components (e.g., executed by a DSP or a general processor) and hardware components (e.g., logic gates and circuitry) within the modem subsystem 1112.

The sidelink COT sharing module 1108 may communicate with various components of the UE 1100 to perform aspects of the present disclosure, for example, aspects of FIGS. 1-3, 4, 5A-5B, 6A-6B, 7, 8A-8B, 9, and 11. In some aspects, the sidelink COT sharing module 1108 is configured to initiate a COT (e.g., the COTs 524, 844) in a shared channel by performing a CAT4 LBT and transmit a first sidelink transmission (e.g., the sidelink transmission 530, 850) during a portion of the COT upon passing the CAT4 LBT. The first sidelink transmission may be a unicast transmission, a groupcast transmission, or a broadcast transmission. In some aspects, sidelink COT sharing module 1108 is configured to include an indicator (e.g., the indicator 532 and 854) in the first sidelink transmission to indicate that the first sidelink transmission is an initiating UE of the COT and that the COT is for sharing (e.g., by indicating a shared portion of the COT).

In some aspects, the sidelink COT sharing module 1108 is configured to receive, from a second UE (e.g., the UEs 115, 315, 502, and/or 1100), a first sidelink transmission (e.g., the sidelink transmission 530, 850) during a first COT (e.g., the COTs 524, 844), where the first COT is initiated by the second UE. The first sidelink transmission may include an indication (e.g., the indicator 642 and 864) of whether the first sidelink UE is transmitted by an initiating UE of the first COT. The sidelink COT sharing module 1108 is configured to determine whether the second UE is one of two or more UEs intended to receive a second sidelink transmission and transmit the second sidelink transmission to the two or more UEs during a portion of the first COT based on COT sharing. The COT sharing is in response to determining the second UE is one of the two or more UEs intended to receive the second sidelink transmission, for example, as discussed above in relation to FIGS. 5A-5B, 6A-6B, and 7.

In some aspects, the sidelink COT sharing module 1108 is configured to receive, from a third UE, a third sidelink transmission (e.g., the sidelink transmission 540, 860) during a second COT. The third sidelink transmission may include data and may indicate that the third sidelink UE is not an initiator of the second COT. The sidelink COT sharing module 1108 is configured to determine whether data decoding from the third sidelink transmission is successful and transmit an ACK/NACK feedback (e.g., the ACK/NACK feedbacks 852 and 862) to the third UE based on the data decoding is successful or not. The sidelink COT sharing module 1108 is further configured to monitor for COT sharing information and whether COT sharing information for the second COT is detected. The sidelink COT sharing module 1108 is further configured to determine whether to transmit the ACK/NACK feedback during the second COT based on whether COT sharing information for the COT is detected, for example, as discussed above in relation to FIGS. 8A-8B and 9.

As shown, the transceiver 1110 may include the modem subsystem 1112 and the RF unit 1114. The transceiver 1110 can be configured to communicate bi-directionally with other devices, such as the BSs 105. The modem subsystem 1112 may be configured to modulate and/or encode the data from the memory 1104 and/or the sidelink COT sharing module 1108 according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., PSCCH, PSSCH, SCI-1, SCI-2, sidelink data, COT-SI, COT sharing information) from the modem subsystem 1112 (on outbound transmissions) or of transmissions originating from another source such as a UE 115 or a BS 105. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 115 to enable the UE 115 to communicate with other devices.

The RF unit 1114 may provide the modulated and/or processed data, e.g. data packets (or, more generally, data messages that may include one or more data packets and other information), to the antennas 1116 for transmission to one or more other devices. The antennas 1116 may further receive data messages transmitted from other devices. The antennas 1116 may provide the received data messages for processing and/or demodulation at the transceiver 1110. The transceiver 1110 may provide the demodulated and decoded data (e.g., PSCCH, PSSCH, SCI-1, SCI-2, sidelink data, COT-SI, COT sharing information) to the sidelink COT sharing module 1108 for processing. The antennas 1116 may include multiple antennas of similar or different designs in order to sustain multiple transmission links. The RF unit 1114 may configure the antennas 1116.

In an aspect, the transceiver 1110 is configured to receive, from a second UE (e.g., the UEs 115, 315, 502, and/or 1100), a first sidelink transmission during a first COT, where the first COT is associated with the second UE. For instance, the first COT is initiated by the second UE. The processor 1102 is coupled to the transceiver and configured to determine whether the second UE is one of two or more UEs intended to receive a second sidelink transmission. The transceiver 1110 is further configured to transmit the second sidelink transmission, to the two or more UEs during a portion of the first COT based on COT sharing. The COT sharing is in response to determining the second UE is one of the two or more UEs intended to receive the second sidelink transmission In an aspect, the UE 1100 can include multiple transceivers 1110 implementing different RATs (e.g., NR and LTE). In an aspect, the UE 1100 can include a single transceiver 1110 implementing multiple RATs (e.g., NR and LTE). In an aspect, the transceiver 1110 can include various components, where different combinations of components can implement different RATs.

FIG. 12 is a flow diagram of a wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the UEs 115, 315, 402, or 1100 may utilize one or more components, such as the processor 1102, the memory 1104, the sidelink COT sharing module 1108, the transceiver 1110, the modem 1112, and the one or more antennas 1116, to execute the steps of method 1200. The method 1200 may employ similar mechanisms as described above in FIGS. 3-4, 5A-5B, 6A-6B, 7, 8A-8B, and 9. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, a first UE (e.g., the UE 115, 315, 502, or 1100) receives, from a second UE, a first sidelink transmission during a first COT, where the first COT is associated with the second UE. The first sidelink transmission may include SCI and sidelink data. In some aspects, the SCI may indicate whether the second UE is an initiating UE of the first COT. In some aspects, the SCI may include a first stage SCI and a second stage SCI. In some instances, the indication (e.g., the indicators 532, 642, 854) of whether the second UE is an initiating UE of the first COT may be included in the first stage SCI. In some other instances, the indication (e.g., the indicators 532, 642, 854) of whether the second UE is an initiating UE of the first COT may be included in the second stage SCI. In some aspects, the SCI may include a COT-SI indicating whether COT sharing in the first COT is allowed. In some instances, the first UE may utilize one or more components, such as the processor 1102, the sidelink COT sharing module 1108, the transceiver 1110, the modem 1112, and the one or more antennas 1116, to perform the operations of block 1220.

At block 1220, the first UE determines whether the second UE is one of two or more UEs intended to receive a second sidelink transmission. In some aspects, the second sidelink transmission is to be transmitted in a groupcast transmission. In some aspects, the groupcast transmission is a connection-based transmission intended to be received by a specific group of UEs (associated with a certain group ID). Accordingly, the first UE may be aware of the UEs in the specific group, and may determine whether the second UE is one of the UEs in the specific group. In some aspects, the groupcast transmission is connectionless. In other words, the second sidelink transmission is not targeted for a specific group of UEs with a certain group ID. Instead, the second sidelink transmission may be intended to be received by UEs at a certain zone or area or within a certain physical distance or range of distance from the first UE. Thus, the second UE may determine whether the first UE is one of the UEs within the certain zone, for example, based on a geographical location of the first UE or a physical distance between the first UE and the second UE. In some instances, zones can be preconfigured, and the second UE may provide zone information (e.g., a zone ID identifying a zone associated with the second UE) in SCI within the first sidelink transmission. In some aspects, the second sidelink transmission is to be transmitted in a broadcast mode for all UEs in a neighborhood of the first UE, and thus the second UE is an intended receiver of the second sidelink transmission. In some instances, the first UE may utilize one or more components, such as the processor 1102, the sidelink COT sharing module 1108, the transceiver 1110, the modem 1112, and the one or more antennas 1116, to perform the operations of block 1220.

At block 1230, the first UE transmits, to the two or more UEs, the second sidelink transmission during a portion (e.g., a shared portion 508 or 808) of the first COT based on COT sharing. The second sidelink transmission can be a groupcast transmission or a broadcast transmission. The COT sharing may be in response to determining the second UE is one of the two or more UEs intended to receive the second sidelink transmission, for example, as discussed above in relation to FIGS. 5A-5B, 6A-6B, and 7. In some instances, the first UE may utilize one or more components, such as the processor

1102, the sidelink COT sharing module 1108, the transceiver 1110, the modem 1112, and the one or more antennas 1116, to perform the operations of block 1230.

In some aspects, the first UE may transmit the second sidelink transmission during the portion of the first COT further based on the SCI (in the first sidelink transmission) indicating that the second UE is the initiating UE of the first COT.

In some aspects, the first UE may transmit the second sidelink transmission during the portion of the first COT further based on the COT-SI (in the first sidelink transmission) indicating the COT sharing in the first COT is allowed.

In some aspects, the first UE may transmit the second sidelink transmission in a connection-based groupcast mode. In some aspects, the first UE may transmit the second sidelink transmission in a connectionless mode. In some aspects, the first UE may transmit the second sidelink transmission in a broadcast mode.

In some aspects, the first UE may further receive, from a third UE (e.g., the UE 115, 315, 402, 502, or 1100) during a second COT, a third sidelink transmission including data. The first UE may determine whether the third UE is an initiating UE of the second COT, for example, based on an indication (e.g., the indications 532, 642, 854, and/or 864) in the third sidelink transmission. The first UE may transmit, during a portion of the second COT in response to determining the third UE is the initiated UE of the second COT, an acknowledgement/negative-acknowledgement (ACK/NACK) feedback for the data, for example, as discussed above in relation to FIGS. 8A-8B and 9.

In some aspects, the first UE may receive, from a third UE during a second COT, a third sidelink transmission including data. The third UE may be a responding UE of the second COT. The first UE may monitor for COT sharing information associated with the second COT. As explained above, the COT sharing information can be carried in SCI, and thus the first UE may perform SCI decoding in SCI resources to detect for the COT sharing information. The first UE may determine, based on the monitoring, whether to transmit an acknowledgement/negative-acknowledgement (ACK/NACK) feedback for the data during a portion of the second COT. In some aspects, the first UE may refrain from transmitting the ACK/NACK feedback during the portion of the second COT in response to determining that there is no COT sharing information associated with the second COT detected from the monitoring. In some aspects, the first UE may further perform a CAT4 LBT and transmit, during a third COT based on the CAT4 LBT, the ACK/NACK feedback. In some aspects, the third sidelink transmission may include a channel access type indicating a CAT4 LBT mode for transmitting the ACK/NACK feedback. In some aspects, the first UE may receive the COT sharing information associated with the second COT, and transmit, during the portion of the second COT in response to receiving the COT sharing information associated with the second COT, the ACK/NACK feedback, for example, as discussed above in relation to FIGS. 8A-8B and 9.

In some aspects, the first UE may further determine whether the second UE is one of two or more UEs intended to receive a third sidelink transmission. The first UE may refrain from transmitting the third sidelink transmission during the portion of the first COT in response to determining the second UE is not one of the two or more UEs intended to receive the third sidelink transmission.

Further aspects of the present disclosure include the following:

Aspect 1 includes a method of wireless communication performed by a first user equipment (UE), the method comprising receiving, from a second UE, a first sidelink transmission during a first channel occupancy time (COT), wherein the first COT is associated with the second UE; determining whether the second UE is one of two or more UEs intended to receive a second sidelink transmission; and transmitting, to the two or more UEs, the second sidelink transmission during a portion of the first COT based on COT sharing, the COT sharing being in response to determining the second UE is one of the two or more UEs intended to receive the second sidelink transmission.

Aspect 2 includes the method of aspect 1, wherein the receiving the first sidelink transmission comprises receiving, from the second UE, sidelink control information (SCI) indicating whether the second UE is an initiating UE of the first COT; and the transmitting the second sidelink transmission during the portion of the first COT based on the COT sharing is further based on the SCI indicating that the second UE is the initiating UE of the first COT.

Aspect 3 includes the method of any of aspects 1-2, wherein the receiving the first sidelink transmission comprises receiving, from the second UE, sidelink control information (SCI) including a COT structure indicator (COT-SI) indicating whether the COT sharing in the first COT is allowed; and the transmitting the second sidelink transmission during the portion of the first COT is further based on the COT-SI indicating the COT sharing in the first COT is allowed.

Aspect 4 includes the method of any of aspects 1-3, wherein the transmitting the second sidelink transmission comprises transmitting the second sidelink transmission in a broadcast mode.

Aspect 5 includes the method of any of aspects 1-4, wherein the transmitting the second sidelink transmission comprises transmitting the second sidelink transmission in a groupcast mode.

Aspect 6 includes the method of any of aspects 1-5, further comprising receiving, from a third UE during a second COT, a third sidelink transmission comprising data; determining whether the third UE is an initiating UE of the second COT; and transmitting, during a portion of the second COT in response to determining the third UE is the initiated UE of the second COT, an acknowledgement/negative-acknowledgement (ACK/NACK) feedback for the data.

Aspect 7 includes the method of any of aspects 1-6, further comprising receiving, from a third UE during a second COT, a third sidelink transmission comprising data; monitoring for COT sharing information associated with the second COT; and determining, based on the monitoring, whether to transmit an acknowledgement/negative-acknowledgement (ACK/NACK) feedback for the data during a portion of the second COT.

Aspect 8 includes the method of any of aspects 1-7, further comprising determining whether the second UE is one of two or more UEs intended to receive a third sidelink transmission; and refraining from transmitting the third sidelink transmission during the portion of the first COT in response to determining the second UE is not one of the two or more UEs intended to receive the third sidelink transmission.

Aspect 9 includes a first user equipment (UE) comprising a memory; a transceiver; and at least one processor coupled to the memory and the transceiver, wherein the first UE is configured to receive, from a second UE, a first sidelink transmission during a first channel occupancy time (COT), wherein the first COT is associated with the second UE; determine whether the second UE is one of two or more UEs intended to receive a second sidelink transmission; and transmit, to the two or more UEs, the second sidelink transmission during a portion of the first COT based on COT sharing, the COT sharing being in response to determining the second UE is one of the two or more UEs intended to receive the second sidelink transmission.

Aspect 10 includes the first UE of aspect 9, wherein the first UE is further configured to receive, from the second UE, sidelink control information (SCI) indicating whether the second UE is an initiating UE of the first COT; and transmit the second sidelink transmission during the portion of the first COT further based on the SCI indicating that the second UE is the initiating UE of the first COT.

Aspect 11 includes the first UE of any of aspects 9 or 10, wherein the first UE is further configured to receive, from the second UE, sidelink control information (SCI) including a COT structure indicator (COT-SI) indicating whether the COT sharing in the first COT is allowed; and transmit the second sidelink transmission during the portion of the first COT further based on the COT-SI indicating the COT sharing in the first COT is allowed.

Aspect 12 includes the first UE of any of aspects 9-11, wherein the first UE is further configured to transmit the second sidelink transmission in a broadcast mode.

Aspect 13 includes the first UE of any of aspects 9-12, wherein the first UE is further configured to transmit the second sidelink transmission in a groupcast mode.

Aspect 14 includes the first UE of any of aspects 9-13, wherein the first UE is further configured to receive, from a third UE during a second COT, a third sidelink transmission comprising data; determine whether the third UE is an initiating UE of the second COT; and transmit, during a portion of the second COT in response to determining the third UE is the initiated UE of the second COT, an acknowledgement/negative-acknowledgement (ACK/NACK) feedback for the data.

Aspect 15 includes the first UE of any of aspects 9-14, wherein the first UE is further configured to receive, from a third UE during a second COT, a third sidelink transmission comprising data; monitor for COT sharing information associated with the second COT; and determine, based on the monitoring, whether to transmit an acknowledgement/negative-acknowledgement (ACK/NACK) feedback for the data during a portion of the second COT.

Aspect 16 includes the first UE of any of aspects 9-15, wherein the first UE is further configured to determine to refrain from transmitting the ACK/NACK feedback during the portion of the second COT in response to determining that there is no COT sharing information associated with the second COT detected from the monitoring; perform a category 4 (CAT4) LBT; and transmit, during a third COT based on the CAT4 LBT, the ACK/NACK feedback.

Aspect 17 includes a non-transitory computer-readable medium storing one or more instructions for wireless communication, the one or more instructions comprising one or more instructions that, when executed by one or more processors of a first user equipment, cause the one or more processors to perform any one of aspects 1-8.

Aspect 18 includes a non-transitory computer-readable medium storing one or more instructions for wireless communication, the one or more instructions comprising one or more instructions that, when executed by one or more processors of a first user equipment, cause the one or more processors to perform any one of aspects 9-16.

Aspect 19 includes a first user equipment (UE) comprising one or more means to perform any one or more of aspects 1-8.

Aspect 20 includes a first user equipment (UE) comprising one or more means to perform any one or more of aspects 9-16.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
   receiving, from a second UE, a first sidelink transmission during a first channel occupancy time (COT), wherein the first COT is associated with the second UE, wherein receiving the first sidelink transmission includes receiving sidelink control information (SCI) including a COT structure indicator (COT-SI) indicating whether the COT sharing in the first COT is allowed;

determining whether the second UE is one of two or more UEs intended to receive a second sidelink transmission; and transmitting, to the two or more UEs, the second sidelink transmission during a portion of the first COT based on COT sharing, the COT sharing being in response to determining the second UE is one of the two or more UEs intended to receive the second sidelink transmission, and further based on the COT-SI indicating the COT sharing in the first COT is allowed.

2. The method of claim 1, wherein:

the receiving the first sidelink transmission further comprises:

receiving, from the second UE, the SCI indicating whether the second UE is an initiating UE of the first COT; and the transmitting the second sidelink transmission during the portion of the first COT based on the COT sharing is further based on the SCI indicating that the second UE is the initiating UE of the first COT.

3. The method of claim 1, wherein the transmitting the second sidelink transmission comprises:

transmitting the second sidelink transmission in a broadcast mode.

4. The method of claim 1, wherein the transmitting the second sidelink transmission comprises:

transmitting the second sidelink transmission in a groupcast mode.

5. The method of claim 1, further comprising:

receiving, from a third UE during a second COT, a third sidelink transmission comprising data;

determining whether the third UE is an initiating UE of the second COT; and transmitting, during a portion of the second COT in response to determining the third UE is the initiated UE of the second COT, an acknowledgement/negative-acknowledgement (ACK/NACK) feedback for the data.

6. The method of claim 1, further comprising:

receiving, from a third UE during a second COT, a third sidelink transmission comprising data;

monitoring for COT sharing information associated with the second COT; and determining, based on the monitoring, whether to transmit an acknowledgement/negative-acknowledgement (ACK/NACK) feedback for the data during a portion of the second COT.

7. The method of claim 1, further comprising:

determining whether the second UE is one of two or more UEs intended to receive a third sidelink transmission; and refraining from transmitting the third sidelink transmission during the portion of the first COT in response to determining the second UE is not one of the two or more UEs intended to receive the third sidelink transmission.

8. A first user equipment (UE) comprising:

a memory;

a transceiver; and at least one processor coupled to the memory and the transceiver, wherein the first UE is configured to:

receive, from a second UE, a first sidelink transmission during a first channel occupancy time (COT), wherein the first COT is associated with the second UE, wherein reception of the first sidelink transmission includes reception of sidelink control information (SCI) including a COT structure indicator (COT-SI) indicating whether the COT sharing in the first COT is allowed;

determine whether the second UE is one of two or more UEs intended to receive a second sidelink transmission; and transmit, to the two or more UEs, the second sidelink transmission during a portion of the first COT based on COT sharing, the COT sharing being in response to determining the second UE is one of the two or more UEs intended to receive the second sidelink transmission, and further based on the COT-SI indicating the COT sharing in the first COT is allowed.

9. The first UE of claim 8, wherein:

the first UE is further configured to:

receive, from the second UE, the SCI indicating whether the second UE is an initiating UE of the first COT; and transmit the second sidelink transmission during the portion of the first COT further based on the SCI indicating that the second UE is the initiating UE of the first COT.

10. The first UE of claim 8, wherein the first UE is further configured to:

transmit the second sidelink transmission in a broadcast mode.

11. The first UE of claim 8, wherein the first UE is further configured to:

transmit the second sidelink transmission in a groupcast mode.

12. The first UE of claim 8, wherein:

the first UE is further configured to:

receive, from a third UE during a second COT, a third sidelink transmission comprising data;

determine whether the third UE is an initiating UE of the second COT; and transmit, during a portion of the second COT in response to determining the third UE is the initiated UE of the second COT, an acknowledgement/negative-acknowledgement (ACK/NACK) feedback for the data.

13. The first UE of claim 8, wherein:

the first UE is further configured to:

receive, from a third UE during a second COT, a third sidelink transmission comprising data;

monitor for COT sharing information associated with the second COT; and determine, based on the monitoring, whether to transmit an acknowledgement/negative-acknowledgement (ACK/NACK) feedback for the data during a portion of the second COT.

14. The first UE of claim 13, wherein:

the first UE is further configured to:

determine to refrain from transmitting the ACK/NACK feedback during the portion of the second COT in response to determining that there is no COT sharing information associated with the second COT detected from the monitoring;

perform a category 4 (CAT4) LBT; and transmit, during a third COT based on the CAT4 LBT, the ACK/NACK feedback.

15. A non-transitory computer-readable medium having program code recorded thereon, the program code comprising:

code for causing a first user equipment (UE) to receive, from a second UE, a first sidelink transmission during a first channel occupancy time (COT), wherein the first COT is associated with the second UE, wherein reception of the first sidelink transmission includes reception of sidelink control information (SCI) including a COT structure indicator (COT-SI) indicating whether the COT sharing in the first COT is allowed;

code for causing the first UE to determine whether the second UE is one of two or more UEs intended to receive a second sidelink transmission; and code for causing the first UE to transmit, to the two or more UEs, the second sidelink transmission during a portion of the first COT based on COT sharing, the COT sharing being in response to determining the second UE is one of the two or more UEs intended to receive the second sidelink transmission, and further based on the COT-SI indicating the COT sharing in the first COT is allowed.

16. The non-transitory computer-readable medium of claim 15, wherein:

the code for causing the first UE to receive the first sidelink transmission is configured to:

receive, from the second UE, the SCI indicating whether the second UE is an initiating UE of the first COT; and the code for causing the first UE to transmit the second sidelink transmission during the portion of the first COT is configured to:

transmit the second sidelink transmission during the portion of the first COT further based on the SCI indicating that the second UE is the initiating UE of the first COT.

17. The non-transitory computer-readable medium of claim 15, wherein code for causing the first UE to transmit the second sidelink transmission is configured to:

transmit the second sidelink transmission in a broadcast mode.

18. The non-transitory computer-readable medium of claim 15, wherein the code for causing the first UE to transmit the second sidelink transmission is configured to:

transmit the second sidelink transmission in a groupcast mode.

19. The non-transitory computer-readable medium of claim 15, further comprising:

code for causing the first UE to receive, from a third UE during a second COT, a third sidelink transmission comprising data;

code for causing the first UE to determine whether the third UE is an initiating UE of the second COT; and code for causing the first UE to transmit, during a portion of the second COT in response to determining the third UE is the initiated UE of the second COT, an acknowledgement/negative-acknowledgement (ACK/NACK) feedback for the data.

20. The non-transitory computer-readable medium of claim 15, further comprising:

code for causing the first UE to receive, from a third UE during a second COT, a third sidelink transmission comprising data;

code for causing the first UE to monitor for COT sharing information associated with the second COT; and code for causing the first UE to determine, based on the monitoring, whether to transmit an acknowledgement/negative-acknowledgement (ACK/NACK) feedback for the data during a portion of the second COT.

21. The non-transitory computer-readable medium of claim 15, wherein the program code further comprises:

code for causing the first UE to determine whether the second UE is one of two or more UEs intended to receive a third sidelink transmission; and code for causing the first UE to refrain from transmitting the third sidelink transmission during the portion of the first COT in response to determining the second UE is not one of the two or more UEs intended to receive the third sidelink transmission.

22. A first user equipment (UE) comprising:

means for receiving, from a second UE, a first sidelink transmission during a first channel occupancy time (COT), wherein the first COT is associated with the second UE, wherein reception of the first sidelink transmission includes reception of sidelink control information (SCI) including a COT structure indicator (COT-SI) indicating whether the COT sharing in the first COT is allowed;

means for determining whether the second UE is one of two or more UEs intended to receive a second sidelink transmission; and means for transmitting, to the two or more UEs, the second sidelink transmission during a portion of the first COT based on COT sharing, the COT sharing being in response to determining the second UE is one of the two or more UEs intended to receive the second sidelink transmission, and further based on the COT-SI indicating the COT sharing in the first COT is allowed.

23. The first UE of claim 22, wherein:

the means for receiving the first sidelink transmission is configured to:

receive, from the second UE, the SCI indicating whether the second UE is an initiating UE of the first COT; and the means for transmitting the second sidelink transmission during the portion of the first COT is configured to:

transmit the second sidelink transmission during the portion of the first COT further based on the SCI indicating that the second UE is the initiating UE of the first COT.

24. The first UE of claim 22, wherein the means for transmitting the second sidelink transmission is configured to:

transmit the second sidelink transmission in at least one of:

a broadcast mode; or a groupcast mode.

25. The first UE of claim 22, further comprising:

means for receiving, from a third UE during a second COT, a third sidelink transmission comprising data;

means for determining whether the third UE is an initiating UE of the second COT; and means for transmitting, during a portion of the second COT in response to determining the third UE is the initiated UE of the second COT, an acknowledgement/negative-acknowledgement (ACK/NACK) feedback for the data.

26. The first UE of claim 22, further comprising:

means for receiving, from a third UE during a second COT, a third sidelink transmission comprising data;

means for monitoring for COT sharing information associated with the second COT; and means for determining, based on the monitoring, whether to transmit an acknowledgement/negative-acknowledgement (ACK/NACK) feedback for the data during a portion of the second COT.

27. The first UE of claim 22, further comprising:

means for determining whether the second UE is one of two or more UEs intended to receive a third sidelink transmission; and means for refraining from transmitting the third sidelink transmission during the portion of the first COT in response to determining the second UE is not one of the two or more UEs intended to receive the third sidelink transmission.

\* \* \* \* \*